United States Patent [19]

Babrowicz et al.

[11] Patent Number: 5,993,922
[45] Date of Patent: Nov. 30, 1999

[54] COMPOSITIONS AND METHODS FOR SELECTIVELY CROSSLINKING FILMS AND IMPROVED FILM ARTICLES RESULTING THEREFROM

[75] Inventors: Robert Babrowicz, Spartanburg, S.C.; William John Gauthier, Laurel; Charles Robert Morgan, Brookeville, both of Md.; William Peyton Roberts, Spartanburg, S.C.; Drew Ve Speer, Columbia, Md.; Andrew W. Van Putte, Greer, S.C.

[73] Assignee: Cryovac, Inc., Duncan, S.C.

[21] Appl. No.: 08/822,529

[22] Filed: Mar. 24, 1997

Related U.S. Application Data

[63] Continuation-in-part of application No. 08/708,517, Sep. 5, 1996, abandoned.
[60] Provisional application No. 60/014,476, Mar. 29, 1996, provisional application No. 60/016,289, Apr. 26, 1996, and provisional application No. 60/016,800, Apr. 26, 1996.
[51] Int. Cl.⁶ .............................. B32B 27/16; B32B 27/32
[52] U.S. Cl. ...................... 428/35.7; 428/35.2; 428/500; 428/517; 428/521; 522/158; 525/192; 525/232; 525/239; 525/240; 264/456; 264/459; 264/471; 264/477; 264/495; 264/211.12
[58] Field of Search .................................... 428/500, 515, 428/517, 521, 35.2, 35.7; 525/193, 194, 232, 239, 332.1, 332.8, 332.5, 240; 522/158, 111, 112; 526/282, 283, 308, 336, 339; 528/502 R, 502 C; 264/456, 459, 471, 477, 485, 495, 211.2

[56] References Cited

U.S. PATENT DOCUMENTS

| | | | |
|---|---|---|---|
| 3,592,881 | 7/1971 | Ostapchenko | 260/897 |
| 3,666,876 | 5/1972 | Forster | 174/36 |
| 3,989,611 | 11/1976 | Shurpik | 522/158 X |
| 4,128,523 | 12/1978 | Britton et al. | 260/33.6 |
| 4,302,557 | 11/1981 | Yoshimura et al. | 525/211 |
| 4,399,181 | 8/1983 | Yoshimura et al. | 428/213 |
| 4,430,468 | 2/1984 | Schumacher | 524/109 |
| 4,507,165 | 3/1985 | Herring | 156/191 |
| 4,607,074 | 8/1986 | Hazelton et al. | 524/425 |
| 4,643,926 | 2/1987 | Mueller | 428/35 |
| 4,714,735 | 12/1987 | Hodgson, Jr. et al. | 524/514 |
| 4,737,559 | 4/1988 | Kellen et al. | |
| 4,863,768 | 9/1989 | Ishio et al. | 428/34.9 |
| 4,878,974 | 11/1989 | Kagawa | 156/85 |
| 4,891,173 | 1/1990 | Saitoh et al. | |
| 4,894,408 | 1/1990 | Hazelton et al. | 524/425 |
| 4,957,974 | 9/1990 | Ilenda et al. | 525/301 |
| 5,013,785 | 5/1991 | Mizui | 526/348.4 X |
| 5,045,620 | 9/1991 | Itaba et al. | |
| 5,055,328 | 10/1991 | Evert et al. | 428/34.9 |
| 5,089,321 | 2/1992 | Chum et al. | 428/218 |
| 5,112,882 | 5/1992 | Babu et al. | 522/158 |
| 5,252,385 | 10/1993 | Kagawa et al. | 428/220 |
| 5,262,503 | 11/1993 | Gotoh | 526/336 |
| 5,292,845 | 3/1994 | Kawasaki et al. | 526/336 |
| 5,310,497 | 5/1994 | Ve Speer et al. | 252/188.28 |
| 5,350,622 | 9/1994 | Speer et al. | 428/215 |
| 5,407,970 | 4/1995 | Peterson et al. | 522/112 X |
| 5,504,171 | 4/1996 | Etherton et al. | 522/158 X |
| 5,523,136 | 6/1996 | Fischer et al. | 428/517 X |
| 5,604,043 | 2/1997 | Ahlgren | 428/517 X |
| 5,670,595 | 9/1997 | Meka et al. | 526/336 |
| 5,763,532 | 6/1998 | Harrington et al. | 525/211 X |

FOREIGN PATENT DOCUMENTS

| | | |
|---|---|---|
| 1125229 | 6/1982 | Canada . |
| 0042148 | 6/1981 | European Pat. Off. . |
| 0333294 | 3/1989 | European Pat. Off. . |
| 0490854 | 6/1992 | European Pat. Off. . |
| 0549372 | 6/1993 | European Pat. Off. . |
| 0597502 A2 | 5/1994 | European Pat. Off. . |
| 1629772 | 9/1965 | Germany . |
| 2030151 | 4/1980 | United Kingdom . |
| 8804674 | 6/1988 | WIPO . |

OTHER PUBLICATIONS

Photoinitiated Crosslinking of Low Density Polyethylene: II. Morphology and Properties; Qing et al; Polymer Engineering and Science, Nov. 1991, vol. 31, No. 22, pp. 1567–1571.

Photoinitiated Cross–Linking of Polyethylenes and Diene Copolymers; Ranby; ACS Symposium Series, 1990, vol. 417, pp. 140–150.

Photocrosslinking of Polypropylene: the effect of different photo–initiators and coagents; Zamotaev et al; Polymer Degradation and Stability 47 (1995) pp. 93–107.

Photochemical Cross–Linking of Polypropylene and Low–Density Polyethylene in the Presence of Acrylic Monomers; Zamotaev et al; Polymer Science, Ser. A, vol. 36, No. 1994, pp. 608–614.

Combined Reactive Extrusion–Orientation of Polyethylene; Suwanda et al; Polymer Engineering and Science, Apr. 1993, vol. 33, No. 8, pp. 455–465.

Crosslinking of Binary Blends of Branches Polyethylene and Poly (1,2–butadiene): 1. Molecular structure and kinetics; Wallgren et al; Polymer 1993, vol. 34, No. 12, pp. 2585–2591.

Miscibility assessment and thermal oxidative stability of blends of branched polyethylene and poly(1,2–butadiene); Wallgren et al; Polymer Bulletin 32 (1994), pp. 687–692.

Structure of Networks of Chemical Crosslinks in Polyethylene Photochemically Crosslinked in the Presence of Various Photoinitiators; Zamotaev et al; Polymer Science USSR, vol. 32, No. 12, (1990) pp. 2553–2560.

(List continued on next page.)

*Primary Examiner*—Fred Teskin
*Attorney, Agent, or Firm*—Mark B. Quatt; Thomas C. Lagaly

[57] ABSTRACT

The present invention generally relates to polymeric compositions capable of providing enhanced crosslinking efficiency, to single and multilayer films having the subject composition contained within at least one layer of said film, to a method of treating said film to provide enhanced crosslink within said at least one layer of the film and to the resultant cross-linked film product as well as articles made from said cross-linked film product.

94 Claims, 8 Drawing Sheets

OTHER PUBLICATIONS

Encyclopedia of Polymer Science and Engineering, 2nd edition, 1986, vol. 6, pp. 522–564.

"Thermoplastic Elastomers Target Rubber and Plastics Markets", Construction & Engineering News, Aug. 5, 1996, pp. 10–14.

"Effect of Trifunctional Monomers and Antioxidants on the Crosslinking Reaction of Polethylne", Pyun, et al, Journal of Korean Nuclear Society, vol. 14, No. 2, Jun., 1982, pp. 70–77.

Food & Drug Administration, HHS, Section 175.300, 21 CFR Ch. 1 (Apr. 1, 1985 Edition), pp. 143–144.

"Preliminary Observations on a New Class of Sensitizers for Crosslinking Polyolefins", Charlesby, et al, Int. R. Radiat. Phys. Chem. 1972, vol. 4, pp. 107–111, Pergamon Press.

"Reactive Oligomers: The Key Compounds of the Next Years Radiation Chemical Technology", Czivkovszky, et al; Radiat.Phys. Chem vol. 35, No. 1–3, pp. 64–70, 1990.

"Reactive Monomers", Richard Grossman, Plastics Additives and Modifiers Handbook, edited by Jesse Edenbaum, Ref TP 1142.P57 1991, Chapter 71, pp. 968–974.

"Organic Peroxides as Cross–Linking Agents", Richard Grossman, Plastics Additives and Modifiers Handbook edited by Jesse Edenbaum, Ref. TP 1142.P57 1991, Chapter 72, pp. 975–983.

"Acceleration of Radiation–Induced Crosslinking in Polyethylene by Diacetylenes", Radiat. Phys. Chem. vol. 14, pp. 729–735, Pergamon Press Ltd, 1979, Patel.

The Radiation Crosslink of PVC with Trimethylolpropane Trimethacrylate. I Dose Dependence & Effect of Thermal Treatment, Bowmer, et al, Journal of Applied Polymer Science, vol. 26, 3669–3688 (1981).

"Radiation Induced Crosslinking of Polyethylene in the presence of BiFunctional Vinyl Monomers", Joshi et al. Radiat. Phys. Chem. 1977, vol. 9, pp. 475–488. Pergamon Press. Great Britain.

"Photoinitiated Crosslinking of Low Density Polyethylene I: Reaction and Kinetics", Qing, et al, Polymer Engineering & Science, Nov. 1991, vol. 31, No. 22.

"Cross–Linking of Polypropylene by Peroxide & Multifunctional Monomer During Reactive Extrusion", Kim et al, Advances in Polymer Technology, vol. 12, No. 3, pp. 263–269 (1993).

"Influence of macromolecular prorads on the network formation in Polyethylene induced by electron beam irradiation", pp. 637–638, Etten et al, Centre for Polymers and Composites, Netherlands.

Akzo Perkalink 301, Bulletin 91–102, Akzo Chemical Inc., pp. 1–2.

Akzo Perkalink 400, Bulletin 91–103, Akzo Chemical Inc., pp. 1–2.

Akzo Nobel, Perkaline 900, Akzo Nobel Chemicals, Inc., Publication 94–110, pp. 1–2.

"Cross–linking Peroxides and Co–agents", Akzo Nobel Chemicals, Inc., pp. 2–12.

"Rubber Chemicals", Akzo Nobel Chemicals, Inc., Publication 94–114, pp. 1–10.

"Sartomer Product Catalog", Sartomer Chemical Co., pp. 1–37.

Cylink Tac Monomer, Tri Allyl Cyanurate, 1990 Cytec Industries, Inc., Cas No. 101–37–1, pp. 1–7.

Cylink Tax Monomer, Tri Allyl Cyanurate Applications and References, Cyanamid, pp. 1–57.

N. N'–methylene–bisacrylamide (MBA), pp. 1–16.

"Organic Peroxides", Luchem AS–946 Revised Data Sheet, Jun. 1989, Elf Atochem North America, Inc., pp. 1–8.

"On JSR RB", Japan Synthetic Rubber Co., Ltd., pp. 1–11.

COMPOSITIONS AND METHODS FOR SELECTIVELY CROSSLINKING FILMS AND IMPROVED FILM ARTICLES RESULTING THEREFROM

This application claims the benefit of 35 USC 19(e) with respect to U.S. Provisional Application 60/014,476 filed Mar. 29, 1996; U.S. Provisional Application 60/016,289, filed Apr. 26, 1996; U.S. Provisional Application 60/016,800, filed Apr. 26, 1996; and claims the benefit of 35 USC 120 as a continuation-in-part of U.S. application Ser. No. 08/708,517, filed Sep. 5, 1996. Each of the foregoing applications are now abandoned. The teachings of each referenced application is incorporated herein by reference.

The present invention generally relates to polymeric compositions capable of providing enhanced crosslinking efficiency to multilayer films having the subject composition contained within at least one layer of said film, to a method of treating said film to provide enhanced crosslink within said at least one layer of the film and to the resultant cross-linked film product as well as articles made from said cross-linked film product.

The present invention is particularly useful for the manufacture of flexible packaging films including those used to package food items.

It has long been known that the physical properties of polymers can be altered by crosslinking. Control of crosslinking can induce a number of desirable changes in the physical properties of a polymer, depending on the application. For example, for polyolefins, the softening temperature increases, as does the toughness, impact strength, and resistance to attack by solvents and grease. Further, if a crosslinked polymer is stretched to induce orientation, the material will have a greater degree of heat-shrink characteristics than an uncrosslinked counterpart sample. However, these same physical properties can present difficulties for manufacture of a product if an attempt is made to merely substitute the crosslinked material for an uncrosslinked raw material. This is particularly true in manufacturing processes that rely on extrusion, coating, or spraying to produce a thin layer of material.

An increase in softening temperature or viscosity, for instance, may take a polymer completely out of the useable range for a given type of equipment. A higher softening temperature would require higher manufacturing temperatures, which may cause other useful components of a film or coating to degrade. A higher viscosity may mean that the material is difficult to spray or extrude, or that the resulting thickness of a coating is undesirably high. Some of the changes in physical properties obtained by crosslinking polymers are discussed in *Photoinitiated Cross-Linking of Polyethylenes and Diene Copolymers*, B. Ranby, *ACS Symposium Series*, 1990, Vol. 417, pp. 140–150; and *Photoinitiated Crosslinking of Low Density Polyethylene I: Reaction and Kinetics*, Y. Qing, X. Wenying, and B. Ranby, *Polymer and Eng. Sci.*, Nov. 1991, Vol. 31, No. 22.

Various processes are known for the industrial manufacture of crosslinked polyolefin materials. These include the use of high energy ionizing irradiation, such as gamma- and accelerated electron beam irradiation (e-beam), as well as chemical crosslinking agents, such as peroxides, silanes and difunctional compounds, monomers and oligomers which can combine with the target polymer.

One of the problems generally associated with chemically cross-linked polymers is that the agents capable of causing the cross-link are normally introduced into the composition prior to its being formed into a packaging article (e.g., film). Thus, cross-linking may occur under the elevated temperature and/or pressure conditions normally encountered while forming the initial film, such as by extrusion. By having the polymeric material cross-linked prior to or during its being processed into a film or the like, the processing step requires much higher energy, may produce a product having unacceptable properties, or, in certain instances, is not practical at all.

Various parties have disclosed the use of high energy irradiation as a means of cross-linking polymeric compositions. For example, German patent publication P 16 29 772.6 by Rosenthal discloses that a relatively thick (500 micron) polyethylene film can be irradiated with an electron beam at a dose of 5 Megarads at a penetration depth of 250 microns and then stretched to a thickness of 20 microns to produce a film with sides (material adjacent to a major surface of the film) having different properties. In that case, the treated side was said to have a melting point of about 160° C., while the untreated side was said to have a melting point of 115° C. Rosenthal teaches that crosslinking can also be accomplished using UV, gamma-rays or x-rays using a photoinitiator such as a chlorinated aromatic or aliphatic compound. Examples cited include tetrachloroethylene, 1,2,4,5-tetrachlorobenzene, and 1,2,4 trichlorobenzene. Such chlorinated aromatic materials are not desirable from a toxicity standpoint, especially for food packaging.

European Application 0 549 372 A1 discloses a method of crosslinking the surface of a molded article made of a copolymer of an alkenylsilane and an olefin having at least two unsaturated double bonds, by dipping the article into a solution of a catalyst in hydrocarbon solvent, and then heating the article for two hours at 80° C.

European Patent Application 0 490 854 A2 teaches a continuous process for crosslinking polyethylene with UV light. Crosslinking occurs during extrusion of the polyethylene while it is in the melt state and under a nitrogen atmosphere. The method employs a photoinitiator such as benzophenone or a benzophenone derivative, and triallylcyanurate (TAC) or triallylisocyanurate (TAIC). While crosslinking aids such as TAC and TAIC are well known in the prior art, they are also highly toxic and unsuitable for food package applications and are taught to require the use of an inert atmosphere, which is costly and inconvenient.

U.S. Pat. No. 4,737,559, issued to Kellen et al Apr. 12, 1988 relates to pressure-sensitive adhesives for bandages. The application discloses that such adhesives tend to build adhesion strength over time, but that the addition of a crosslinking monomer with p-acryloxybenzophenone and subsequent exposure to UV radiation yields an adhesive which has a good ability to conform to the skin surface, adequate initial adhesion, and limited adhesion build-up, while providing low residue upon removal.

In *Polymer*, 1993, 34(12), 2585–91, Gedde et al, describe the thermal crosslinking of polyethylene using low molecular weight, 1,2-polybutadiene and peroxides. Thermal crosslinking has limited applicability because of inherent instability during the extrusion and/or molding steps. Such processes always suffer from some degree of trade off between processability and amount of premature crosslinking.

In *Polymer Science, Ser. A*, 1994, 36(5), 608–14, Zamotaev et al, describe the UV crosslinking of polypropylene and low density polyethylene using benzophenone and difunctional acrylates.

In *Reza Kenkyu*, 1993, 21(9), 974–80, Ueda et al, describe the crosslinking of polyethylene with an excimer laser using benzophenone or 4-chlorobenzophenone as photoinitiators. The excimer laser is an impractical radiation source because it requires focusing to a small area (10×20 mm) and is quite expensive. Furthermore, in this case, long irradiation times and high radiation doses were required.

While each of the above referenced teachings and others disclose means of cross-linking polymeric films using irradiation, a number of problems are associated with the resultant cross-linked product, especially when the film is contemplated for use as a packaging article. Packaging materials formed of one or more polymer layers, such as films having two major surfaces and thickness of up to about 50 mils, have been used to form closed packages. For example, the packaging material may be a film which has at least one layer (normally a surface layer) which is suitable to provide heat sealing. The ability to be heat sealed relies on the ability of the material to flow when heated near its softening or melting temperature. Inner or core layers, on the other hand, may be present to provide strength, toughness, shrink characteristics and the like.

During manufacture, such films are sometimes exposed to radiation, such as electron-beam radiation or other radiation to crosslink the polymeric material forming the film packaging material. Such techniques do not distinguish the different layers forming a film. Thus, when the irradiation is applied, it may adversely affect one or more layers while providing the desired beneficial effect to other layers of the film. For example, it is desirable to have certain surface characteristics which provide desired sealability of the outer layer of a polyolefin film when subjected to highspeed packaging equipment. However, when irradiation is applied to such films to enhance the core layers characteristics, the radiation indiscriminately adversely effects the sealability of the film. In addition, the performance of the sealant layer for its intended purpose is generally lowered when crosslinking is induced. This is because the higher the degree of crosslinking of the sealant material, the less is its ability to flow at a given processing temperature. Thus, the resultant packaging material exhibits weaker and sometimes defective seals.

If one lowers the dosage of irradiation to which the overall film is exposed (if irradiation is the method of crosslinking) one may be able to lessen the adverse effect on the sealant material. However, when this is done, other layers which benefit from crosslinking (e.g. to provide toughness, improved optics, or greater processability during manufacture) may not perform as well. Thus, the processor is faced with the trade-off between compromising sealing properties and other desired properties of films, such as toughness and processability.

Furthermore, it is well known that certain resins, such as poly(vinylidene dichloride) (PVDC) and poly(propylene) (PP), and other polymers having tertiary carbons within their structure, degrade upon exposure to ionizing radiation. Thus, improvements in physical properties associated with crosslinking by such method cannot always be realized in films containing such materials.

In addition to balancing the concerns associated with irradiation crosslinking to achieve good seal properties as well as processability and toughness properties, there are two technical parameters which further complicate this matter. The first is that materials typically used in sealant layers (e.g., ethylene/vinyl acetate copolymers ("EVA") and the like) tend to crosslink to a higher degree at a given irradiation dosage than those materials typically used as part of the internal layers of a film (e.g., ethylene/alpha-olefin copolymers, such as linear low density polyethylene (LLDPE) and the like). Stated another way, a polymeric layer for which crosslinking is desired may be inherently less susceptible to crosslinking than a layer of the film for which crosslinking is not required.

A second factor is that in irradiation processes where a tubular film is exposed to irradiation from one side of the tube, then the other in a "multipass" setup, the geometry of the tubular film and the physics of irradiation are such that the surface layers (e.g., sealant material) will absorb more radiation than the internal or core layers. Thus, although the preferred approach is to minimize crosslinking of the sealant layers, the tendency of many typical irradiation processes, is to cause more, not less, crosslinking of the sealant material.

In order to overcome the indiscriminate crosslinking caused by high voltage irradiation, U.S. Pat. No. 4,863,768 (Ishio et al) teaches low voltage irradiation of films to provide for attenuation of the radiation across the films cross-section (thickness). However, this method has certain defects including the significant financial investment in equipment needed to use this technology on a commercial scale, the inherent unpredictability as to the degree of crosslinking achieved at each layer as well as the inapplicability of this technique for films having a sealant/core/sealant configuration.

Still another proposed solution is the use of crosslinking enhancers typically in the form of liquids or powders. Examples include low molecular weight (LMW) compounds such as peroxides, and unsaturated esters such as diallylmaleate, trimethylolpropanetrimethylacrylate, and 1,6-hexanediol diacrylate. These materials pose several practical problems, including difficulty of handling liquids and powders during extrusion, regulatory status (lack of food law compliance for many of these materials), organoleptic concerns, and poor compatibility with typical extrusion-grade polymers. Peroxides, in particular, are inherently thermally unstable. When used, they can initiate crosslinking of polymers in the extruder. The reaction kinetics involved makes the extrusion process difficult to control. Extrusion rates and overall process conditions must be rigorously controlled to avoid fluctuations in final film properties.

It is highly desired to have a means to selectively enhance the crosslinking efficiency (i.e., degree of crosslinking at a unit dosage of radiation) of a specific layer or layers of a film in an effective and commercially acceptable manner, preferably in a continuous process. It is further highly desired to provide a means to crosslink one or more layers of a film composed of a polymer (e.g., polypropylene, PVDC and the like) generally deemed degraded by certain ionizing irradiation, especially electron beam radiation. It is still further desired to be able to crosslink a polymer film by irradiation to provide a clear, transparent film product suitable for use in packaging applications.

SUMMARY OF THE INVENTION

The present invention provides a means to selectively enhance the crosslinking efficiency of a polymeric film and, more particularly, to achieve enhanced crosslinking with respect to certain layer or layers of a multilayer film. The present invention further provides a means of achieving selective crosslinking of at least one layer of a polymeric film using actinic irradiation (e.g., ultraviolet radiation or electron beam radiation) and, still further, to permit the desired crosslinking to occur on films containing polypropylene, PVDC and other polymers, without having the resultant film exhibit the degradative effects normally associated with such treatment.

Specifically, the present invention is directed to multi-layer film having at least one layer for which crosslinking is desired wherein said layer contains a PCE composition composed of (i) a copolymer formed from monomers comprising (a) at least one polyene monomer, (b) at least one $C_2$–$C_{20}$ olefin monomer and, optionally, (c) one or more additional copolymerizable monomers different from (a) and (b) above or, alternatively, (ii) polymer mixture composed of at least one polymer having units derived from (a) at least one polyene monomer; and at least one polymer having units derived from (b) at least one $C_2$–$C_{20}$ olefin monomer and, optionally at least one additional copolymerizable monomer different from (a) and (b) above for this mixture. The composition, preferably, further contains a photoinitiator agent, especially when the radiation to be applied is ultraviolet radiation. The layer(s) having the PCE composition results in a crosslinked layer of the film having a higher degree of crosslink than other layers. The subject PCE composition can be used alone to form a layer of a film or can be blended with one or more polymers to provide a layer of a film for which crosslinking is desired.

The present invention is further directed to a method of forming a film having at least one selected crosslinked layer. The method comprises the forming of a polymeric film having at least one layer of the film's thickness which contains the subject crosslinking enhancer composition therein and subjecting the film to actinic radiation (e.g., electron beam or ultra-violet irradiation).

The present invention is still further directed to a multilayer film product having at least one first layer of the films thickness which comprises a crosslinked polymeric composition and at least one second layer of the film's thickness comprising a polymeric composition which is crosslinked to a lesser degree than that of the first layer. The film product is formed according to the method described hereinabove.

The present invention is still further directed to a package formed of a packaging material and having a cavity capable of having or actually having an article, wherein the package material is composed of the subject single or multi-layer film which has the subject crosslink enhancer composition in at least one layer thereof and the package material has been subjected to irradiation to cause crosslinking of the polymeric material of said at least one layer.

The above invention is fully described herein below.

DESCRIPTION OF THE INVENTION

Figure 1:
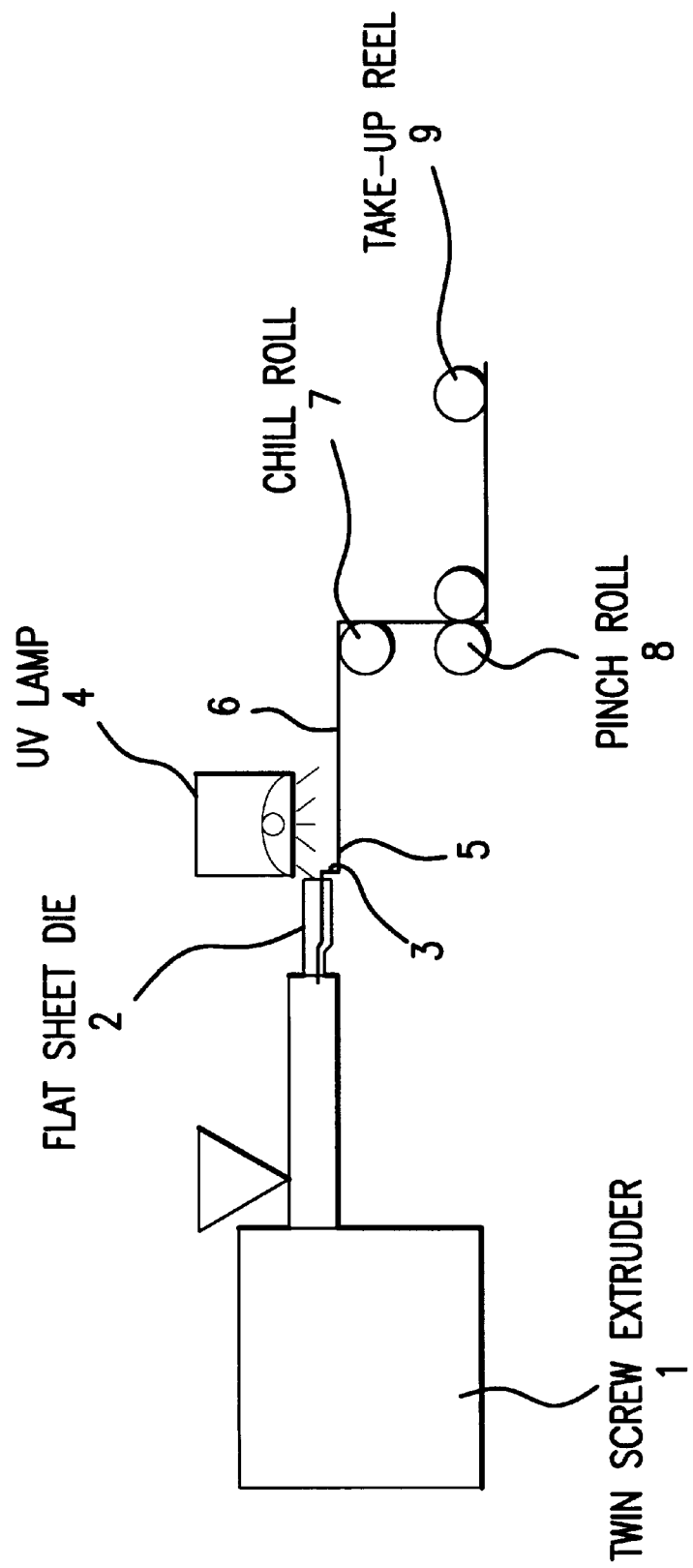
FIG. 1 is a schematic diagram of a melt-state irradiation crosslinking process. In this process, a conical twin screw extruder (1) is attached to a flat sheet die (2) with a die lip gap (3). A source of irradiation, such as a Fusion Systems UV lamp (4) (equipped with a H-bulb) is positioned at or near the die lip gap (3) in such a way as to insure that the extruded film (5) passes through the focal point of the lamp (4). The irradiated film (6) is drawn over a chill roll (7) and cooled. The resulting film is drawn through pinch rolls (8) and wound up on a take-up reel (9)

The present invention is directed to a new and novel composition and method of using same to provide an improved multi-layer film suitable for packaging foodstuffs and other products and the like. At least one layer of the film formed according to the present invention comprises a polymeric crosslink enhancer (PCE) composition which provides that said at least one layer can be crosslinked to a higher degree than would occur in the absence of enhancer composition without adversely affecting the desirable characteristics of other layers present in the film.

The present invention provides for a polymeric crosslink enhancing composition comprising (i) a copolymer comprising units derived from (a) polyene monomer, (b) at least one $C_2$–$C_{20}$ olefinic monomer, and optionally (c) at least one additional copolymerizable monomer which is different from (a) and (b) above or, alternatively, (ii) a mixture of a polymer formed from monomers comprising polyene monomer (a) and a polymer formed from monomers comprising at least one $C_2$–$C_{20}$ olefin monomer (b) and, optionally at least one additional copolymerizable monomer different from (a) and (b) above of composition (ii). In addition, the PCE composition of this invention preferably further contains a photoinitiator compound, especially when the contemplated irradiation of the film is to be by ultra-violet radiation.

The following terms are defined herein below to aid in describing and defining the subject invention herein and in the claims appended hereto:

"Film" shall mean a sheet, laminate, non-woven or woven web or the like or combinations thereof, having length and breadth dimensions and having two major surfaces with a thickness therebetween. The film can be composed of more than one layer (laminate, plies) composed of at least two different compositions, extending substantially the length and breadth dimensions of the film. The thickness of the film can be any suitable thickness of up to about 50 mils to form a package and is normally up to about 20 mils, preferably up to about 15 mils, more preferably up to about 10 mils and most preferably from 0.1 to 8 mils.

"Layer" or "ply" means herein a member forming all or a fraction of the thickness of a film wherein the member extends the length and breadth of the film and is composed of a distinct composition.

"Crosslinked" or "crosslink" means herein the formation of chemical bonds directly or indirectly (via some chemical structural entity) between two or more of the molecular chains of polymers within a layer of the film. The degree of crosslinking is typically shown by a change in the melt flow index, as measured according to ASTM D-1238 with respect to uncrosslinked composition of the same type. Higher degrees of crosslinking are typically reported gel fraction as measured according to ASTM-D-2765 with values of greater than one percent (1%) gel indicating some degree of crosslink.

"Polyene" means herein a monomer, as defined in Hawley's Condensed Chemical Dictionary, 12th Edition, page 932, comprising any unsaturated aliphatic or alicyclic compound containing at least four carbon atoms in a chain and having at least two double bonds. The term "at least two double bonds" refers to carbon—carbon double bonds. One or more bonds or double bonds of carbon and an element other than carbon can, optionally, also be present in the polyene, such as carbonyl.

"Substituted" means herein the result of a chemical reaction in which one atom or group of atoms replaces another atom or group of atoms in the structure of a molecule. It especially refers to the substitution of a hydrogen atom, of a hydrogen-carbon moiety, with an alkyl, aryl, hydroxy, halogen, or other chemical substituent.

"Polymer" means herein a molecule that has been formed by the union of a considerable number of simple molecules with one another. The simple molecules that will unite to provide a polymer are known as monomers and their union is called polymerization. The polymer may comprise a union of monomers which are all alike to provide a homopolymer, or of two or more varieties of monomers to provide copolymers which are sometimes specifically called copolymers, terpolymers, tetrapolymers, etc.

"Flowability" means herein the ability of a film or layer to flow under the influence of heat and/or pressure. This term is especially used with respect to films or layers capable of sealing to itself or some other material. Flowability is typically reported as melt flow index (MFI) conventionally measured according to the procedure of ASTM D-1238. Flowability is an alternative way to indicate the level of crosslinking as the higher the degree of crosslink a material, the lower is its MFI.

"Ultra-violet" or "UV" means radiation at a wavelength or a plurality of wavelengths in the range of from 170 to 400 nm.

"Ionizing radiation" means high energy radiation capable of generating ions and includes electron beam radiation, gamma rays and x-rays.

"E-Beam" means ionizing radiation of an electron beam generated by Van de Graaff generator, electron-accelerator or x-ray.

"PCE" means a polymeric crosslink enhancer and refers to composition of the subject invention and to the components thereof.

"AUPO" means herein a PCE copolymer of an advanced unsaturated polyolefin type formed by catalytic polymerization using at least one single-site catalyst, preferably at least one catalyst known as metallocene catalyst, to have high random distribution of comonomeric units therein.

The present PCE composition can be composed of composition (i) comprising a copolymer formed with monomeric units derived from (a) at least one polyene monomer; (b) at least one $C_2$–$C_{20}$ olefinic monomer; and, optionally, (c) at least one or more copolymerizable monomers other than (a) and (b) above. Further, the present PCE composition may contain a compound suitable to act as a photoinitiator wherein said compound is blended with the PCE copolymer.

The monomer (a) of the PCE copolymer is selected from a polyene. Examples of such polyenes are exemplified by but not limited to the following: 5-ethylidene-2-norbornene ("ENB"), 5- methylidene-2-norbornene, 5-vinyl-2-norbornene ("VNB"), 5-methylene-2-norbornene, 2,5-norbornadiene, butadiene, isoprene, 1,4-hexadiene ("HD"), 4-methyl-1,4-hexadiene, 5-methyl-1,4-hexadiene, 4-ethyl-1,4-hexadiene, 1,5-hexadiene, 1,6-heptadiene, 1,4-heptadiene, 1,5-heptadiene, 5-methyl-1,4-heptadiene, 1,4-octadiene, 1,5-octadiene, 1,6-octadiene, 5-ethyl-1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 1,9-decadiene, 6-methyl-1,6-undecadiene, 1,8-nonadiene, 1,13-tetradecadiene, 1,4-dodecadiene, 1,5-cyclooctadiene, 1,4-divinylcyclohexane, 1,3-divinylcyclohexene, 1-allyl-4 -vinylcyclohexane, 1,4-divinylcyclohexane, 1,3-divinylcyclopentane, 1-allyl-3-vinylcyclopentane, 1,5-divinylcyclooctane, 1-allyl-5-vinylcyclooctane, 1,5-diallylcyclooctane, 1-allyl-4-isopropenylcyclooctane, 1-allyl-4-isopropenylcyclohexane, 1-isopropenyl-3-vinylcyclopentane, 1-allyl-4-isopropenylcyclohexane, 4-vinylcyclohexene("VCH"), dicyclopentadiene ("DCPD"), divinylbenzene and vinylisopropenylbenzene. They can be used singly or in combination with one another as the polyene component of the polymeric crosslink enhancer. The preferred polyenes are butadiene, ENB, VNB, HD, DCPD and VCH and particularly preferred as part of AUPOs are ENB and VNB and most preferred are VNB.

The monomer (a) should be capable of forming units of the PCE copolymer wherein at least some of the units retain ethylenic unsaturation.

The monomer(s) (b) of the PCE copolymer is at least one $C_2$–$C_{20}$ olefinic monomer such as an olefin of 2 to 20 carbon atoms. Such monomers (b) are exemplified by, but are not limited to: ethylene, propylene, 1-butene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 3,5,5-trimethylhexene, 1-octene, 1-decene, 1-dodecene, 1-tetradecene, 1-hexadecene, 1-octadecene, 1-eicosene. Typically the monomer (b) is a $C_2$–$C_8$-olefin and most typically either ethylene or propylene.

The PCE copolymer may, optionally, contain at least one third monomer (c) selected from monomers which are other than (a) or (b) monomers described above. Such monomer (c) are exemplified by but not limited to: vinyl aromatics, such as styrene or styrene derivatives and the like, cycloolefin monomers, such as cyclopentene, norbornene, tetracyclododecene and the like, unsaturated esters, such as vinyl acetate, methyl acrylate, ethyl acrylate, and butyl acrylate and the like, and unsaturated acids, such as acrylic acid or methacrylic acid or their acid salts and the like as well as polyvinyl halide such as polyvinyl chloride.

PCE copolymers of the present invention have a density at 25° C. of preferably between 0.8 and 1.0 g/cc.

The PCE copolymer, as used in PCE composition (i), will generally have a polyene content of 0.01 to 40 mole %, preferably from 0.1 to 10 mole %. The remainder of the PCE copolymer (the at least one $C_2$ to $C_{20}$ olefinic monomer(s) (b) as well as any third or additional monomer(s) (c) will form 99.99 to 60 mole %, such as 99.9 to 90 mole %, of the polymeric crosslinking enhancer. The weight average molecular weight (Mw) of the copolymer should be at least about 20,000 daltons, preferably from at least about 10,000 to 1,000,000 daltons. A variety of factors will determine the optimal composition for a particular end-use which include compatibility with any diluent polymer, degree of reactivity with respect to the radiation to be utilized and the like. The optimal composition for a particular PCE copolymer can be readily determined by minor experimentation.

PCE copolymers of the present invention are exemplified by but not limited to ethylene-propylene-diene monomer terpolymers (EPDM's) where the diene monomer is most commonly selected from ENB, HD, DCPD or VCH.

The PCE composition may further include a photoinitiator compound. Such compounds are blended with the PCE copolymer to provide a substantially uniform composition. When ultra-violet radiation is contemplated as the form of irradiation, the PCE composition preferably should contain the photoinitiator in order to increase the crosslink efficiency, i.e., degree of crosslink per unit dose of radiation. When E-Beam radiation is contemplated as the form of irradiation, the PCE composition may, optionally, include a photoinititator. Although E-Beam radiation is not normally associated with photoinitiators as crosslinking readily occurs in the absence of such compounds, it has been unexpectedly found that when the present PCE composition is employed which contains such photoinitiator compounds, crosslink efficiency increases and, therefore, the operator can use less PCE composition, attain higher degree of crosslink, utilize lower dosage of electron beam radiation or a combination thereof.

Suitable photoinitators include, but are not limited to, benzophenone, ortho- and para-methoxybenzophenone, dimethylbenzophenone, dimethoxybenzophenone, diphenoxybenzophenone, acetophenone, o-methoxyacetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 3-o-morpholinodeoxybenzoin, p-diacetylbenzene, 4-aminobenzophenone, 4'-methoxyacetophenone, α-tetralone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydrophyranyl ether, 4,4'-bis(dimethylamino)-benzophenone, 1'-acetonaphthone, 2'acetonaphthone, acetonaphthone and 2,3-butanedione, benz[a]anthracene-7,12-dione, 2,2-dimethoxy-2-phenylacetophenone, α,α-diethoxy-acetophenone, α,α-dibutoxyacetophenone, anthraquinone, isopropylthioxanthone and the like. Polymeric initiators include poly (ethylene/carbon monoxide), oligo[2-hydroxy-2-methyl-1-[4-(1-methylvinyl)phenyl]propanone], polymethylvinyl ketone, and polyvinylaryl ketones. Use of a photoinitiator is preferable in combination with UV irradiation because it generally provides faster and more efficient crosslinking.

Preferred photoinitiators that are commercially available include benzophenone, anthrone, xanthone, and others, the Irgacure™ series of photoinitiators from Ciba-Geigy Corp., including 2,2-dimethoxy-2-phenylacetophenone (Irgacure™ 651); 1-hydroxycyclohexylphenyl ketone (Irgacure™ 184) and 2-methyl-1-[4-(methylthio)phenyl]-2-morpholino propan-1-one (Irgacure™ 907). The most preferred photoinitiators will have low migration from the formulated resin, as well as a low vapor pressure at extrusion temperatures and sufficient solubility in the polymer or polymer blends to yield good crosslinking efficiency. The vapor pressure and solubility, or polymer compatibility, of many familiar photoinitiators can be easily improved if the photoinitiator is derivatized. The derivatized photoinitiators include, for example, higher molecular weight derivatives of benzophenone, such as 4-phenylbenzophenone, 4-allyloxybenzophenone, 4-dodecyloxybenzophenone and the like. The photoinitiator can be covalently bonded to the PCE copolymer or to a polymer diluent, as described herein below. The most preferred photoinitiators will, therefore, be substantially non-migratory from the packaging structure.

The photoinitiator is added in a concentration of about 0.1 to 3 weight percent, preferably 1 to 2 weight percent of the layer containing the PCE composition. In the case where the photoinitiator is bound to a polymer, the polymer will typically be added at such a level as to provide 0.1 to 3 percent of photoinitiator by weight of the layer containing the PCE composition.

In another embodiment of the present invention, the PCE composition may be composed of a mixture of at least one polymer having units derived from a polyene (a); and at least one polymer having units derived from $C_2$–$C_{20}$ olefinic monomer(s) (b) alone or with monomer(s) (c), each described hereinabove. For example, 1,2-polybutadiene, styrene/butadiene copolymers and the like having a molecular weight (Mw) of 1,000 to 1,000,000, preferably 1,000 to 200,000 can be used in combination with a second polymer formed of at least one monomer (b) and, optionally, at least one monomer (c). For purposes of this description and the defined invention of the claims appended hereto the term "PCE copolymer" shall also refer to the mixture of polymers as herein described unless specifically stated otherwise. In view of the fact that same such polymers are substantially compatible with polyolefins in up to about 5 weight percent, good distribution can be easily obtained which results in more uniform distribution of crosslinks in the resultant layer of the film.

When the PCE copolymer comprises a polymer mixture (ii) as described above, the mixture will generally be of a polymer comprising a polyene in from 0.01 to 40 weight percent, preferably from about 0.1 to 10 weight percent based on the mixture (ii) and the polymer of monomer(s) (b) and, optionally (c) will comprise the remainder of the polymer mixture (ii). The preferred polyene of the mixture is polybutadiene, styrene-butadiene copolymers and styrene-isoprene copolymers.

The PCE copolymer may be formed by known polymerization processes employing Ziegler-Natta transition metal catalysts as, for example, those based on vanadium. However, it is preferred that the resultant copolymer have the unsaturation uniformly distributed throughout the PCE polymer molecule. That is to state, it is preferred that the copolymers contain unsaturated sites which are essentially isolated from each other. Conventional polymerization processes tend to incorporate multiple identical units adjacent to one another (in blocks) resulting in polymers with less random distribution of unsaturation within the polymer molecule.

A preferred set of PCE copolymers are PCE copolymers (i) and, of these the most preferred are those which are produced by at least one single-site catalyst, preferably at least one metallocene catalyst, to provide polymeric materials with a super-random distribution of comonomers. A single-site catalyst is defined as a catalyst which contains a single type of active center. The resulting polymer from a single-site catalyst exhibits a narrow molecular weight distribution frequently has a polydispersity (Mw/Mn) of less than 3, and narrow compositional distribution. A metallocene catalyst is defined as an organometallic compound with at least one pi-bound cyclopentadienyl-moiety (or substituted cyclopentadienyl moiety) and most frequently two pi-bound cyclopentadienyl-moieties or substituted moieties. This includes other CS pi bound moieties such as indenyls or fluorenyls or derivatives thereof. These materials often display higher regio-regularity and, in certain cases, higher stereoregularity than conventionally prepared copolymers, such as conventionally prepared PCE copolymers. For the purposes of this disclosure such PCE copolymers are referred to as advanced unsaturated poly(olefin)s (hereinafter "AUPO").

AUPO's are produced in more chemically homogeneous form, with a molecular weight distribution that is narrow, with less catalyst residue than conventionally prepared PCE copolymers. They are thus beneficial in forming films for packaging applications according to the present invention, especially food packaging. They also offer physical properties superior in utility and scope to current copolymer technology.

AUPO's can be described as copolymers identical in composition to that described above for PCE copolymers (i). They differ however in the process by which they are manufactured which involves the use of at least one single-site catatlyst and preferably a metallocene catalyst. Typical polyenes which traditionally have been used are limited to highly substituted polyenes such as 5-ethylidene-2-norbornene, dicyclopentadiene or 1,4-hexadiene. More reactive polyenes often cannot be employed using vanadium-based catalytic systems (used in conventional EPDM technology, for example) as they tend to crosslink prematurely leading to gelled, difficult to process materials. It is highly desirable to be able to prepare AUPO's which contain more reactive polyenes to facilitate crosslinking and other polymer modification/grafting reactions. Such materials can be crosslinked by chemical (such as peroxide, silane or sulfur), or by ionizing or nonionizing radiation processes.

A first improvement obtained by the use of these AUPO materials is that they require less energy to be crosslinked to a given level of crosslinking, and provide more versatility in crosslinking, than conventional PCE copolymers of the same type. AUPO's crosslink to a substantially higher degree than saturated resins at a given energy level. This improvement is largely based on improved distribution of the polyene component along the polymer backbone leading to improved crosslink efficiency.

A second improvement with AUPO resins involves improved regioselectivity over vanadium-based catalysts giving less chain scission, which competes with crosslinking.

A third improvement of AUPO's over conventional PCE copolymers of the same type involves the oxidative and light stability of the resin. This leads to unsaturated resins with a lower yellowness index.

A fourth improvement of AUPO's over conventional PCE copolymers is there greater ease of processing to form films and layers.

AUPO's, by virtue of their higher crosslinking efficiency, offer enhanced orientability, toughness, puncture resistance, tear resistance, impact, tensile strength, and/or elongation, and thus are suitable as for aiding in the formation of a core and/or abuse layer in multilayer films, bags and laminates. They can be selectively crosslinked at a lower radiation (e.g., electron-beam) dosage than currently used materials so that ionizing radiation-sensitive resins, such as vinylidene dichloride copolymers and polypropylene can be used without substantial degradation, and with improved organoleptic quality.

AUPO's also offer comparably better blends with improved physical properties compared with blends using conventional PCE copolymers (including amorphous EPDM resins) due to improved grafting reactions and reduced chain mobility. For example, melt crosslinking a blend of two or more polymers which exhibit appreciable solubility at elevated temperatures but phase separate on cooling could be improved if one of the components crosslinks and/or grafts thus reducing the tendency to phase segregate and, thus, improve the aging characteristics. This can result in improved optics in the final film made from these materials. Improvements in blend properties can also be realized since there can be closer matching of resin densities and refractive indices, and also provides for reduced yellowness. Multi-component blends containing AUPO's with improved optics and physical properties can be thereby produced.

AUPO's can be chosen with regard to their molecular weight and crystallinity in order to tailor blends of these materials with other resins in order to optimize physical properties of a film made from the blend, e.g. optical properties such as gloss, haze, and clarity. This degree of tailoring is not possible with more conventionally produced PCE copolymers.

AUPO's also offer outstanding shrink characteristics, i.e. higher free shrink, lower shrinking temperatures, and improved orientability compared with conventional ethylenelalpha-olefin copolymers.

Methods of making these materials using metallocene catalysts are disclosed in International Application WO 88/04674 by Welborn, et al., which teaching is incorporated herein by reference as if set forth in full. Typical examples of AUPO'S are those copolymers described above except that they are prepared using a single-site catalytic process, such as metallocenes. These include, but are not limited to, terpolymers of ethylene-propylene-polyene monomer, ethylene-butene-polyene monomer, ethylene-hexene-polyene monomer, ethylene-heptene-polyene monomer, ethylene-octene-polyene monomer, ethylene-4-methyl-1-pentene-polyene monomer, ethylene-norbornene-polyene monomer, and ethylene-styrene-polyene monomer, where the diene is selected from ENB, VNB, HD, DCPD, VCH, 1,7-octadiene, 1,9-decadiene or DVB.

Preferred AUPO resins contain highly reactive vinyl groups without premature crosslinking or gelation such as reaction extruder or reactor or the like. The preferred dienes include 5-vinyl-2-norbornene. Unsaturated PCE copolymers of olefins and 5-vinyl-2-norbornene can be prepared using simple metallocene catalysts such as $Cp_2ZrCl_2$ without premature crosslinking. In this case, the cyclic-olefinic group is polymerized leaving the pendant vinyl group available for subsequent crosslinking or modification/grafting reactions. Alpha,omega-dienes, such as 1,7-octadiene and 1,9-decadiene, and other acyclic dienes containing an alkyl substituent alpha to one of the vinyl groups are also preferred. Examples of such acyclic dienes are 3-methyl-1,5-hexadiene, and 3-methyl-1,7-octadiene. Vinyl-unsaturated materials exhibit outstanding crosslinking characteristics which lead to films, bags or laminates with improved physical properties.

Preferred AUPO resins comprise single-site catalyzed polymeric materials with a density of between 0.8 and 1.0 g/cc, such as between 0.84 and 0.96 g/cc, between 0.86 and 0.94 g/cc, between 0.88 and 0.92 g/cc, and between 0.89 and 0.91 g/cc. All density values falling within any of these stated ranges are also included herein.

The PCE composition of the present invention can be used alone to provide at least one layer of a film or can be used in conjunction with one or more diluent polymers suitable for forming the at least one layer for which enhanced crosslinking is desired. The amount of PCE composition (either as PCE copolymer alone or further with photoinitiator, as described above) to be combined with diluent polymer(s) may be from about 0.1 to 99.9 weight percent of the composition forming the target layer. The exact amount will depend on the degree of crosslinking desired, the compatibility of the subject PCE composition and the diluent polymers used in a particular instance and, therefore, all values of weight percentages and ranges between 0.1 and 99.9 weight percent are made part of the present teaching.

The diluent polymers are exemplified by, but not limited to: homopolymers and copolymers of olefins, such as polyethylene, including high density polyethylene, low density polyethylene, ultra-low density polyethylene, linear low density polyethylene, polypropylene, as well as ethylene/propylene copolymers, polystyrene copolymers, ethylene/acrylate or alkacrylate copolymers, ethylene/acrylic acid or alkacrylic acid copolymers and ionomers, ethylene/vinyl acetate and the like and mixtures thereof.

The crosslink may occur between and/or among molecules of PCE copolymer. Further, the PCE copolymer may crosslink or react with molecules or fragments of molecules of the diluent polymer. For example, a crosslink may be formed between a first and a second PCE copolymer molecule or crosslinks may occur among a first PCE copolymer molecule, a second PCE copolymer molecule and a third PCE copolymer. Crosslink may also occur between at least one PCE copolymer and diluent polymer molecule or a fragment of such molecules. Diluent polymer molecules may have residual ethylenic unsaturation suitable as a site for entering into a crosslinking with another molecule. In the case of polymers having tertiary carbon-hydrogen bonds, such as polypropylene and the like, which may undergo scission of the polymer molecule upon ionizing irradiation, it has been found that the presence of the subject PCE coplymer inhibits scission to occur and/or provides a means of recombining the polymer fragments formed with themselves or as part of the PCE copolymer. Thus, the degradative effect of scission commonly associated with ionizing irradiation of certain polymers is substantially reduced.

The PCE composition is preferably a solid at ambient temperatures which is usually between 20 and 25° C. When the PCE copolymer is used in a composition which will be used in conjunction with diluent polymer, the melt flow index (MFI) is chosen to be compatible with the rheology of the PCE copolymer with the polymer diluent or with the materials of the other layers of the film, if present. PCE copolymers of low weight average molecular weight (LMW) of about 5,000 grams/mole or less, are less preferred because they present difficulties in handling, because of the extra step which may be required to compound such low molecular weight compounds with the diluent polymer forming the layer's matrix, and because of the tendency of these low molecular weight materials to bloom or migrate through the film after extrusion if crosslinking is delayed. It is preferred to provide the PCE composition as solid pellets so that they are easily blended with the other polymeric raw materials (such as ethylenic polymers), which are also typically provided in pellet form. Thus, these materials can be preblended prior to being fed to an extruder or other apparatus used to form the film structures. The polymeric crosslinking enhancer composition will preferably have a low yellowness index prior to, and following, irradiation and should possess good organoleptic properties (i.e. not impart off-odors or flavors to foods).

The melt flow index (MFI) of the solid PCE copolymer should be between 0.01 and 100 dg/min under ASTM D-1238 at 2.16 kg/190° C., although higher MFI materials may be used. The preferred MFI is between 0.1 and 20 dg/min, and more preferably between 0.1 and 10 dg/min, as such MFI polymers are typically used in packaging applications (ASTM D-1238, Condition E).

The number average molecular weight ($M_n$) of the PCE copolymer of the invention is preferably at least 10,000 daltons, and more preferably at least 15,000, 20,000, 40,000, or 60,000 daltons. The $M_n$ is normally between 10,000 and 1,000,000, preferably between 10,000 and 200,000 daltons, such as between 20,000 and 100,000, between 30,000 and 80,000, between 40,000 and 70,000, and between 50,000 and 60,000 daltons (grams/mole).

The weight average molecular weight ($M_w$) of the PCE copolymer should be at least about 10,000 daltons and preferably at least 20,000 daltons. The preferred $M_w$ can be between 20,000 and 1,000,000 daltons, such as between 30,000 and 350,000, between 50,000 and 250,000, between 70,000 and 170,000, more preferably between 90,000 and 130,000 daltons.

The viscosity average molecular weight ($M_v$) of the PCE copolymer can be between 20,000 and 1,000,000, preferably between 30,000 and 350,000, such as between 50,000 and 250,000, between 75,000 and 150,000, more preferably between 90,000 and 125,000 daltons. For example, when the subject film has a food contact end-uses, a $M_v$ of at least 120,000 daltons is preferred for purposes of compliance with current U.S. food law (FDA) regulations.

Although the PCE copolymer may be amorphous, it is preferred that the copolymer be semi-crystalline. Thus, AUPO's used as PCE copolymers in the present invention can have crystallinity ranging from 0 to about 70% or greater, such as ranges of from 0.001% to 45% for materials with propylene as the predominant monomer (b), and from 0.001 % to 70% for materials with ethylene as the predominant monomer (b). For the purposes of this disclosure, crystallinity is defined as the fraction of crystals formed as determined by conventional X-ray diffraction methods.

Conventional polyolefins typically have a certain number of double bonds within their molecular structure. The PCE copolymers of the present invention contributes additional unsaturation to this "background" or baseline unsaturation primarily due to the polyene present. Too low a polyene content (taking into account the percent of the polyene in the copolymer, the percentage unsaturation of the polyene monomer itself, the amount of antioxidant present, and the percentage of the PCE copolymer in a blend of PCE composition and diluent polymer, where present) can result in insufficient crosslinking enhancement. It is preferred that the PCE copolymer contain at least 10 carbon—carbon ethylenic double bonds (C=C) per 100,000 carbon atoms of the copolymer molecule. The number of ethylenic double bonds may range from 10 to 33,333 double bonds per 100,000 carbon atoms with from about 20 to about 1000 being preferred. It is understood that all numerical values and ranges within the specific ranges disclosed are incorporated herein by reference. Thus, the PCE copolymer will provide more double bonds to the layer's composition because of the presence of the polyene, than a similar polymer without the polyene. The most desirable unsaturation is vinyl unsaturation (also called terminal or pendent unsaturation), but internal double bonds can also be used. Such polymers will contain unsaturation at a level significantly higher than that represented by the polymer end groups, and are also characterized by a uniform distribution of unsaturation within the matrix (i.e., random copolymers). The unsaturation of such polymers is most readily characterized by infra-red (IR) spectroscopy.

Too high a polyene content (again taking into account the percent of the polyene in the copolymer, the percentage unsaturation of the polyene monomer itself, the percentage of the PCE composition and diluent polymer, where present) can result in extrusion gels or inclusions which can, if severe enough, affect orientation stability (if an oriented film is being made) and can even result in bubble breaks. Even if not severe enough to cause the film to break, the optics (gloss, clarity, haze) of the final film can be adversely affected by such inclusions. For packaging applications where optics are important, this can mean film which is not commercially acceptable. Thus, it is preferred to have the polyene content of the PCE copolymer within a range to provide from 10 to about 10,000 and preferably from 20 to 1,000 ethylenic double bonds per 100,000 carbon atoms present in the layer composition.

For example, the calculated levels of unsaturation (number of C=C bonds per 100,000 carbon atoms) for a representative group of polyenes useful as PCE copolymers are as shown in Table 1 herein below:

TABLE 1

| | C = C/100,000 C | |
|---|---|---|
| Weight % polyene in PCE Copolymer | ENB | 1,4-HD |
| 0 | 0 | 0 |
| 1 | 116 | 171 |
| 2 | 233 | 341 |
| 3 | 349 | 512 |
| 4 | 465 | 682 |
| 5 | 581 | 852 |
| 6 | 697 | 1022 |
| 7 | 813 | 1192 |

The values of unsaturation given in Table 1 assume that (1) ethylene and propylene are the two other monomers in the PCE copolymer, and (2) the ratio by weight of ethylene to propylene is 3:1.

The present invention provides a means of providing a desired degree of crosslinking of polymeric material of a particular layer or layers of a film while not adversely effecting any other layers of the film. It is useful in providing the desired crosslinking of the target layer(s) of a multi-layer film having resins, which are normally adversely effected by ionizing irradiation, especially that of E-Beam irradiation as, for example, polypropylene, vinylidene dichloride copolymers and the like. Such polymers tend to undergo chain scission and resultant degradation when exposed to E-Beam radiation at dosages of 10 to 100 kiloGrays. It has been found that the PCE compositions of the present invention when used as a layer or a blend component of a layer, unexpectedly imparts the desired level of crosslink and its associated properties while minimizing or substantially eliminating the degradation products and results normally encountered.

The film of the invention can be made by any conventional means, including coextrusion, lamination, extrusion coating, or corona bonding, irradiated and optionally oriented. The above steps can be carried out in various order and/or repeated as known to those skilled in the art. The materials to be used in forming the subject layer of the film may be formed, for example, by initially mixing the PCE composition with diluent polymer (if desired) during the film-forming extrusion step by using a single or twin screw extruder in any of various mixing sections in manners well known in the art. In some instances, it may be preferable to pre-compound the materials prior to the film-forming extrusion step. Irradiation can be done by any conventional means. In the irradiation process, the film is subjected to an actinic radiation treatment, such as ultra-violet, corona discharge, plasma, X-ray, gamma ray, beta ray, or high energy electron treatment, such as electron-beam radiation, which induces cross-linking between molecules of the irradiated material.

The ionizing irradiation of polymeric films is disclosed in U.S. Pat. No. 4,064,296, to Bornstein, et. al., which teaching is hereby incorporated in its entirety by reference. Ionizing radiation dosages are commonly referred to in terms of the radiation unit "RAD", with one million RADS, also known as a megarad, being designated as "MR", or, in terms of the radiation unit kiloGray (kGy), with 10 kiloGray representing 1 MR, as is known to those skilled in the art. A suitable radiation dosage of high energy electrons is in the range of between 5 and 200 kGy, preferably between 20 and 150 kGy, and more preferably between 30 and 120 kGy such as between 40 and 90 kGy. Preferably, irradiation is carried out by an electron accelerator and the dosage level is determined by standard dosimetry methods. Other accelerators such as a Van de Graaff or resonating transformer may be used. The radiation is not limited to electrons from an accelerator since any ionizing radiation may be used. As can be seen from the descriptions of preferred films for use in the present invention, the most preferred amount of radiation is dependent upon the film and its end use and the exact dosage can be readily determined by one skilled in the art.

The film may, alternately, be irradiated with ultra-violet radiation. In this embodiment the PCE composition may, preferably, contain at least one photoinitiator agent described herein above. The radiation should be emitted from a source capable of emitting radiation of the wavelength of from 170 to 400 nanometers (nm). The radiation dosage should be at least 0.1 Joule per $cm^2$ and preferably from 0.5 to 10 Joules per $cm^2$ and most preferably from 0.5 to about 5 Joules per $cm^2$. The dosage required on a particular application will depend on the configuration of the layer in the film, the composition of the layer, the temperature of the film being irradiated and the particular wavelength used. The dosage required to cause crosslinking to occur for any particular set of conditions can be determined by the artisan.

Any UV source capable of being positioned at or near the die lip so that the film passes through the focal point of a lamp while the layer to be crosslinked is still in the melt state can be used.

In another embodiment of the invention, the layer need not be crosslinked upon extrusion, but may be crosslinked at some later time, at the convenience of the processor, and typically in conjunction with other processing steps. In this embodiment, the crosslinking may take place at room temperature or at an elevated temperature which is below the melting point of the film as a whole. For example, a film having layers with different melting points can be heated to a temperature between the two melting points and then irradiated. The crosslinking effect would be greatly enhanced in the layer with the lower melting point, yielding some of the benefits of melt-phase crosslinking without tying the crosslinking step to the time and location of the extrusion step.

The present invention as described herein relates to improved methods and materials for making multilayer thermoplastic films, however, one of ordinary skill in the art will readily recognize that it is applicable to thermoplastic objects in a variety of forms such as cups, bottles and trays. In addition, a film or coating made according to the present invention may be applied to a variety of substrates, including other polymeric materials, paper, glass, silica, and metal, as well as fabrics made from natural and synthetic fibers.

A common measure of the amount of crosslinking in an irradiated film is gel content or percent (%) gel. The weight fraction of polymer insoluble in a suitable solvent, such as boiling toluene or boiling xylenes, is referred to as the % gel and this is an indication of degree of crosslinking. It is determined by placing a 0.4 to 0.5 gram sample weighed to ±0.1 mg into a cellulosic or Teflon extraction thimble. About 100 ml solvent is poured into a 400 ml Erlenmeyer flask having a block-tin condenser with copper cover, and borosilicate glass siphon cup. Three to six boiling stones (carborundum or equivalent) are added to the flask. The flask is then set on a hot plate, the thimble is placed in the siphon cup, and the siphon cup and condenser are positioned into the flask. The toluene is brought to a boil, and the heat is adjusted to yield a reflux rate of between two and four drops per second. The material is refluxed for twenty one hours. The thimble is then removed with forceps. The sample is air dried under a hood for at least two hours. The sample is transferred to a vacuum oven heated at 50° C. under 25 to 30 inches of mercury vacuum, and the sample is dried in the oven for 24 hours. The gel is weighed on an analytical balance. Gel % is calculated by the formula:

$$\frac{\text{Gel weight, g} \times 100}{\text{Sample weight, g}} = \% \text{ gel}$$

The sample is extracted a second 21 hours to assure complete dissolution of all soluble portions. If the gel of the second extraction is more than 3% (absolute) less than the gel of the first extraction, subsequent extractions are run.

An alternate measure of the amount of crosslinking in an irradiated film is "flowability". A lower flowabilility value indicates a greater degree of crosslinking.

Figure 2:
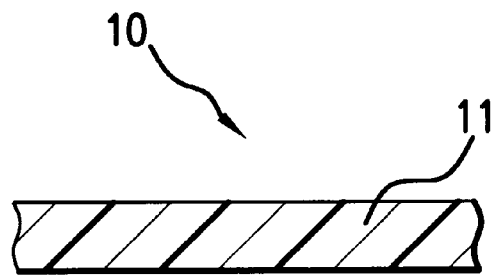
FIG. 2 is a schematic cross-section of a film suitable for use as part of a multilayer film of the present invention.

The following is a detailed description of the drawings:

FIG. 1 is a schematic diagram of a melt-state irradiation crosslinking process. In this process, a conical twin screw extruder (1) is attached to a flat sheet die (2) with a die lip gap (3). A source of irradiation, such as a Fusion Systems UV lamp (4) (equipped with a H-bulb) is positioned at or near the die lip gap (3) in such a way as to insure that the extruded film (5) passes through the focal point of the lamp (4). The irradiated film (6) is drawn over a chill roll (7) and cooled. The resulting film is drawn through pinch rolls (8) and wound up on a take-up reel (9);

FIG. 2 illustrates a layer 11 which contains a PCE composition of the present invention to provide enhanced crosslink at a given irradiation dosage. Such a layer can be combined with other layers to provide a multilayer film.

Figure 3:
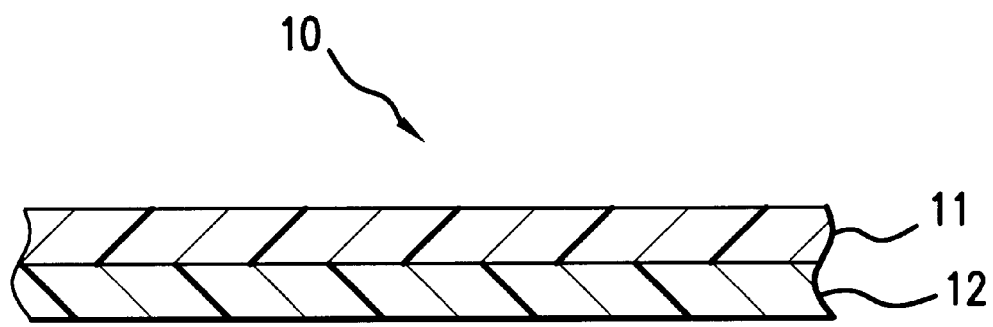
FIGS. 3 through 8 are schematic cross-sections of alternative embodiments of films of the present invention.

FIG. 3 shows a multilayer film having layers 11 and 12. Layer 12 is a sealable, preferably heat sealable, layer which can be formed of any polymeric material, such as a polyolefin; more preferably ethylenic polymers, such as ethylene/alpha-olefin or ethylene/unsaturated ester copolymers, such as ethylene/vinyl acetate copolymer, and ethylene/alkyl acrylate copolymer; as well as polyamides, or polyesters. Layer 11 is as described above.

Figure 4:
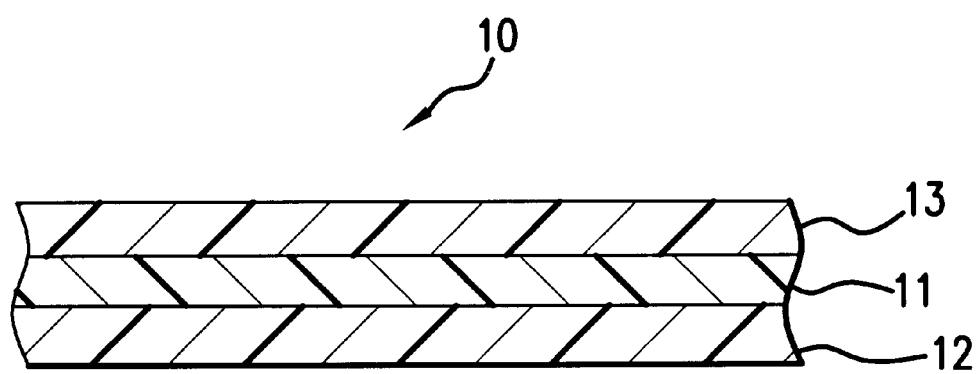

FIG. 4 shows a multilayer film with layers 11, 12, and 13. Layer 13 is an abuse-resistant layer useful as an outermost layer of a film for packaging applications. This layer can be formed by any polymeric material such as a polyolefin, more preferably ethylenic polymers, such as ethylene/alpha-olefin or ethylene/unsaturated ester copolymers, polypropylene, polyamide, polyester, and the like. The layers 11 and 12 are as described above.

Figure 5:
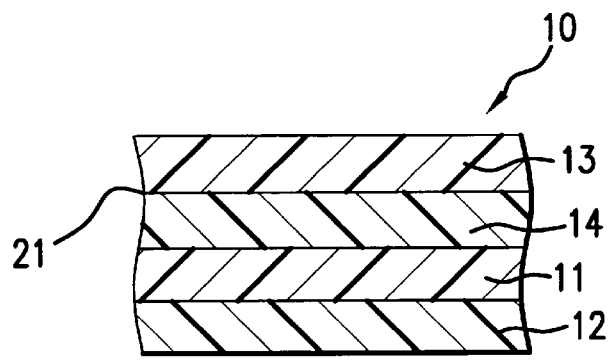

FIG. 5 shows a multilayer film with layers 11, 12, 13 and 14. Layer 14 is an adhesive layer in films where such a material beneficially ensure or enhance interlaminar bond strength between any or all of layers 11, 12, and 13. The specific placement of layer 14 in a film of the invention, as shown in FIG. 4, is by way of example only. Such adhesives may be polymeric, such as an acid or an acid anhydride-grafted polyolefins. Alternatively, layer 13 can represent a conventional adhesive or glue of any suitable kind, e.g. polyurethane adhesive where a laminate of the multilayer film 10 with another is contemplated. The remaining layers are as described above.

Figure 6:
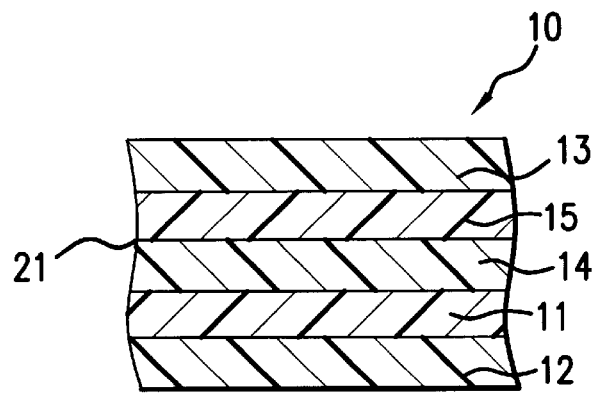

FIG. 6 shows a multilayer film with layers 11, 12, 13, 14, and 15. Layer 15 comprises an oxygen barrier material, such as ethylene-vinyl alcohol copolymer (EVOH), vinylidene dichloride/vinyl chloride copolymer, vinylidene dichloride/methyl acrylate copolymer, polyester, or polyamide, etc. The remaining layers are as described above.

Figure 7:
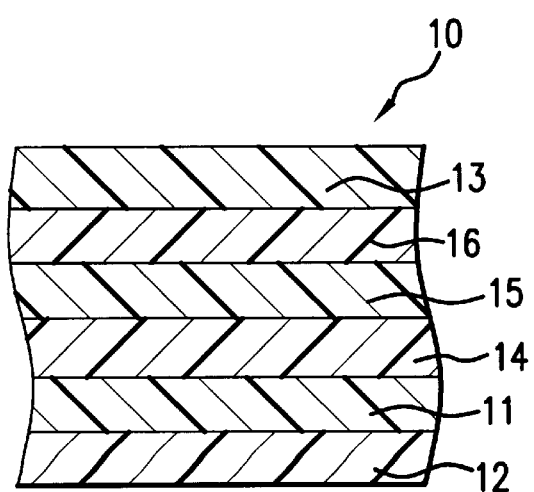

FIG. 7 shows a multilayer film with layers 11, 12, 13, 14, 15, and 16. Layer 16 comprises a core or internal layer which contributes bulk, shrinkability, toughness, or some other function or property to the overall film. Layer 16 can comprise any of the polymers disclosed for the other layers. The remaining layers are as described above.

Figure 8:
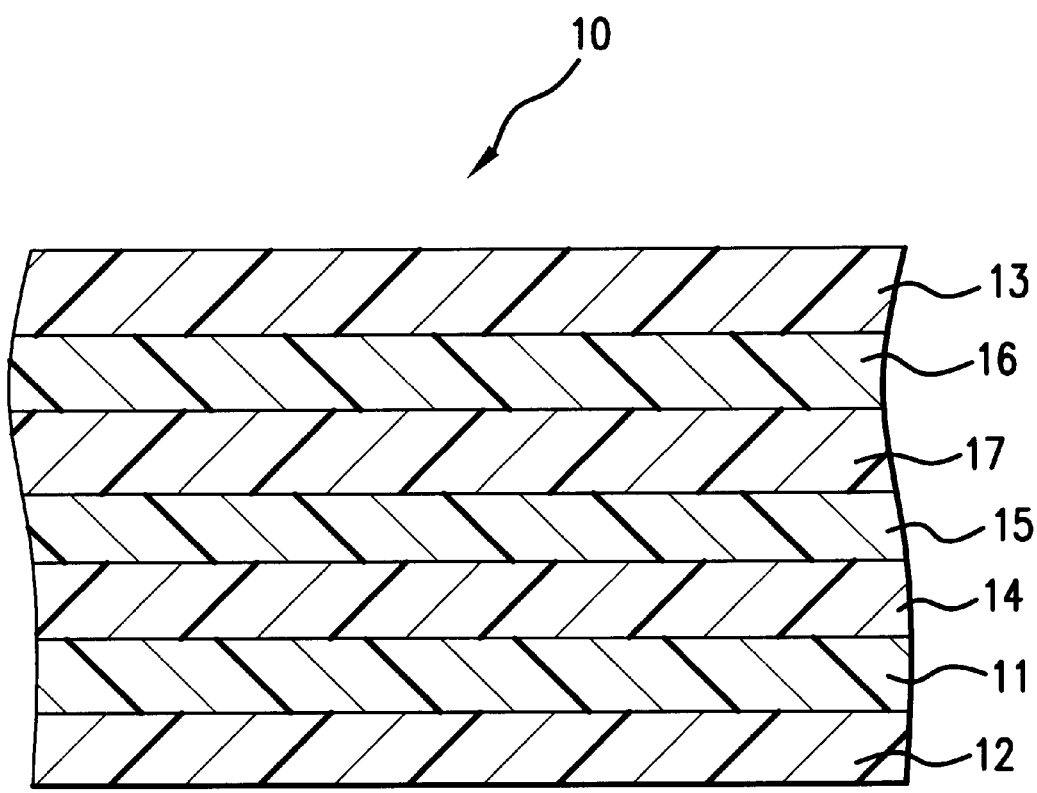

FIG. 8 shows a multilayer film with layers 11, 12, 13, 14, 15, 16, and 17. Layer 17 comprises an adhesive layer in cases where such a material can be beneficial in ensuring or enhancing interlaminar bond strength. Such adhesives have already been described with respect to FIG. 4. The remaining layers are as described above.

The present invention can be used to crosslink to the polymeric composition of different layers at different levels. For example, an abuse-resistant layer (13) and/or an internal layer (16) can be crosslinked to a greater extent than a sealant layer (12). This may be accomplished by varying the amount of PCE composition contained in each target layer.

FIGS. 9 through 12 are bar graphs comparing monolayer films of the present invention to other, control films that do not have a crosslinking enhancer. These graphs are described in detail below with respect to the examples.

The present invention can be used to enhance the crosslink content of one or more layers of a film. The film has two major surfaces and a thickness which extends from one major surface to the other. The film thickness is composed of n layers where n is a positive integer of from 1 to an upper value Z which can be any positive integer of two or greater and usually is a value of from 2 to 14, preferably 2 to 12. The film will have x layers for which enhanced crosslink is desired (target layers) where x is an integer of from 1 to an upper value of (Z−1). The target layers may be any layer or combination of layers of the film including layer(s) providing one or both of the film's major surfaces or any of the layers spaced away from the major surfaces (core layers) or a combination thereof. The choice of layers will be dictated by the configuration of the film and the layer(s) for which crosslink is desired without causing deterioration of the other layers and, thereby, provide an improved film product.

The invention may be further understood by reference to the examples shown below. These examples are given for illustrative purposes only and are not meant to be a limitation on the invention described herein or defined by the claims appended hereto. All parts and percentages are by weight unless otherwise stated.

Tables 2, 2A, and 2B identify the materials used in the examples. The Tables thereafter describe the films made with these materials.

TABLE 2

| MATERIAL* | TRADENAME | SOURCE |
| --- | --- | --- |
| PE1 | Dowlex ™ 2045.03 | Dow |
| PE2 | DPF 1150.02 | Dow |
| PE3 | Affinity ™ PL 1270 | Dow |
| PE4 | Affinity ™ PF 1140 | Dow |
| PE5 | XU59001.00 | Dow |
| PE6 | XU59202.01 | Dow |
| PE7 | DPF1150.01 | Dow |
| PE8 | Affinity ™ XU 59220.04 | Dow |
| PE9 | Dowlex ™ 2045.14 | Dow |
| PE10 | Dowlex ™ 2037 | Dow |
| EV1 | XV 65.93 | Exxon |
| EV2 | LD-318.92 | Exxon |
| EV3 | Escorene ™ LD-761.36 | Exxon |
| EV4 | PE 1335 | Rexene |
| OB1 | XU 32034.06 | Dow |

TABLE 2-continued

| MATERIAL* | TRADENAME | SOURCE |
| --- | --- | --- |
| OB2 | E-151 | Evalca |
| PA1 | Grilon ™ CF6S | EMS |
| EM1 | EMAC ™ SP 1305 | Chevron |
| AB1 | 10,075 ACP concentrate | Teknor Color |
| AB2 | 80,274 ACP concentrate | Teknor Color |
| AD1 | Admer ™ SF 700 A | Mitsui |

*PE1 = LLDPE, an ethylene/1-octene copolymer with a density of 0.920 gm/cc and a 1-octene content of about 6.5 wt %.
PE2 = a single site, branched, ethylene/1-octene copolymer with a density of 0.901 gm/cc and a 1-octene content of about 12.5 wt %.
PE3 = a single site, branched, ethylene/1-octene copolymer with a density of 0.898 gm/cc and a 1-octene content of about 13 wt %.
PE4 = a single site, branched, ethylene/1-octene copolymer with a density of 0.8965 gm/cc and a 1-octene content of about 14 wt %.
PE5 = a single site, branched, ethylene/1-octene copolymer with a density of 0.91 gm/cc and a 1-octene content of about 10 wt %.
PE6 = a single site, branched, ethylene/1-octene copolymer with a density of 0.900 gm/cc and a 1-octene content of about 13 wt %.
PE7 = a single site, branched, ethylene/1-octene copolymer with a density of 0.901 gm/cc and a 1-octene content of about 12.5 wt %.
PE8 = a single site, branched, ethylene/1-octene copolymer with a density of 0.896 gm/cc and a 1-octene content of about 14 wt %.
PE9 = LLDPE, an ethylene/1-octene copolymer with a density of 0.920 gm/cc and a 1-octene content of about 6.5 wt %.
PE10 = LMDPE, an ethylene/1-octene copolymer with a density of 0.935 gm/cc. and a 1-octene content of about 2.5 wt %.
EV1 = ethylene vinyl acetate copolymer with 15 wt % vinyl acetate comonomer.
EV2 = ethylene vinyl acetate copolymer with 9 wt % vinyl acetate comonomer.
EV3 = ethylene vinyl acetate copolymer with 28 wt % vinyl acetate comonomer.
EV4 = ethylene vinyl acetate copolymer with 3.3 wt % vinyl acetate monomer.
OB1 = 96 wt. % vinylidene dichloride/methyl acrylate copolymer with 8.5 wt. % methyl acrylate comonomer, 2 wt. % epoxidized soybean oil, and 2 wt. % butyl acrylate/methyl methacrylate/butyl methacrylate terpolymer.
OB2 = ethylene/vinyl alcohol copolymer (44 mole % ethylene).
PA1 = nylon 6,12 copolymer.
EM1 = ethylene/methyl acrylate copolymer with 20 wt. % methyl acrylate comonomer.
AB1 = 89.8 wt % low density polyethylene (Exxon LD 203.48) + 10 wt % synthetic amorphous silica (Syloid™ 74X6500 from Davison Chemical) + 0.2 wt % calcium stearate.
AB2 = 82 wt % low density polyethylene (Exxon LD 203.48) + 10 wt % synthetic amorphous silica (Syloid™ 74X6500 from Davison Chemical) + 0.2 wt % calcium stearate + small amount of pigments.
AD1 = anhydride-grafted polyolefin blend.

TABLE 2A

| | | |
| --- | --- | --- |
| CE1 | Keltan ™ 2308 | DSM |
| CE2 | Polysar ™ 227P | Bayer |
| CE3 | Vistalon ™ 8731 | Exxon |
| CE4 | Dutral ™ 4033 | Enichem |
| CE5 | Vistalon ™ 3708 | Exxon |
| CE6 | Polysar 847XP | Bayer |
| CE7 | Nordel ™ 2722-elec | DuPont |
| CE8 | Keltan ™ 5509 | DSM |
| CE9 | Royalene ™ IM 7200 | Uniroyal |
| CE10 | Tafmer ™ TP 3180 | Mitsui |
| CE11 | Royalene ™ IM 7100 | Uniroyal |
| CE12 | EP 181SP | JSR |
| CE13 | Keltan ™ 5808 | DSM |
| CE14 | Nordel ™ 5892 (2760) | DuPont |
| CE15 | Nordel ™ 3681 (2744) | DuPont |
| CE16 | EP 57P | JSR |
| CE17 | Dutral ™ 4028 | Enichem |
| CE18 | Dutral ™ 4038 | Enichem |
| CE19 | Keltan ™ E801 | DSM |
| CE 20 | Nordel ™ 2722-P | DuPont |

The crosslinking enhancers copolymer (CE1 through CE 20) were EPDM resin type PCE copolymers having the composition and properties listed in Table 2B below.

TABLE 2B

| PCE | $C_2$ (wt %)[a] | DIENE (wt %)[a] | DIENE TYPE | MOONEY VISCOSITY ML 1 + 8 @ 100° C. | MOONEY VISCOSITY ML 1 + 4 @ 125° C. | MFI (dg/min) |
| --- | --- | --- | --- | --- | --- | --- |
| CE1 | 73 | 2.0 | ENB* | | | |
| CE2 | 75 | 3.0 | ENB | 24.2 | 14.3 | |
| CE3 | 74 | 3.0 | ENB | 30.3 | 21.0 | |
| CE4 | 76 | 3.0 | ENB | 26.9 | 15.3 | |
| CE5 | 65 | 3.5 | ENB | 79.2 | 47.0 | |
| CE6 | 74 | 4.0 | ENB | 85.0 | 57.0 | |
| CE7 | 72 | 6.0 | HD** | 31.1 | 23.2 | |
| CE8 | 73 | 4.5 | ENB | | | |
| CE9 | 76 | 4.5 | ENB | 65.8 | 46.4 | |
| CE10 | 75 | 4.7 | ENB | 12.6 | 6.6 | |
| CE11 | 74 | 5.0 | ENB | | | 6.0[b] |
| CE12 | 75 | 5.9 | ENB | | | |
| CE13 | 67 | 6.0 | ENB | | | |
| CE14 | 71 | 6.0 | HD | 80.4 | 58.9 | |
| CE15 | 71 | 6.0 | HD | 61.9 | 46.1 | |
| CE16 | 72 | 7.1 | ENB | | | |
| CE17 | 76 | 3–5 | ENB | | | |
| CE18 | 73 | 3–5 | ENB | | | |
| CE19 | — | — | ENB | | | 3.0[c] |
| CE20 | | | HD | 31.9 | 24.1 | |

[a]Monomer content determined by ASTM D-3900.
[b]MFI determined by ASTM D-1238 at 230° C./21.6 kg.
[c]MFI determined by ASTM D-1238 at 230° C./10.0 kg.
*ENB = 5-ethylidene-2-norbornene
**HD = 1,4-hexadiene Mooney Viscosity was measured in accordance with ASTM 1646. In this procedure a Mooney viscometer is used to measure the effects of time of shearing and temperature on the comparative viscosities of rubber compounds. Rotor torque in "Mooney units" (1 MU=0.833 N.m) is recorded over a 4 or 8 minute period, typically passing through a broad minimum, and the minimum is reported as the Mooney viscosity.

Certain materials were blended together to form some of the film structures, and these blends are identified as follows:
PEB1=90 parts PE1+10 parts AB1.
PEB2=92.5 parts EV2+7.5 parts PE1.
PEB3=90 parts PE6+10 parts PE1.
PEB4=85 parts PE7+15 parts PE1.
PEB5=75 parts PE6+25 parts PE1.
PEB6=75 parts PE7+25 parts PE1.
CEB1=90 parts PE2+10 parts CE3.
CEB2=90 parts PE2+10 parts CE2.
CEB3=70 parts PE2+20 parts PE1+10 parts CE2.
CEB4=60 parts PE2+30 parts PE1+10 parts CE2.
CEB5=60 parts PE2+30 parts PE1+10 parts CE3.

Some of the PCE copolymers were further analyzed to determine molecular weight and molecular weight distribution. The results of the analysis appear in Table 3.

TABLE 3

| PCE type | $M_n$ (× 1000 g/mol) | $M_w$ (× 1000 g/mol) | $M_z$ (× 1000 g/mol) | $M_{z+1}$ (× 1000 g/mol) | $M_v$ (× 1000 g/mol) | Dispersity $M_w/M_n$ | Intrinsic Viscosity (dL/g) |
| --- | --- | --- | --- | --- | --- | --- | --- |
| CE2 | 56 | 121 | 270 | 549 | 109 | 2.15 | 1.41 |
| CE3 | 39 | 162 | 574 | 1,058 | 117 | 4.18 | 1.26 |
| CE4 | 47 | 115 | 203 | 302 | 105 | 2.45 | 1.31 |
| CE5 | 62 | 200 | 489 | 873 | 173 | 3.22 | 1.97 |
| CE6 | 88 | 217 | 491 | 876 | 188 | 2.47 | 2.10 |
| CE7 | 31 | 153 | 505 | 894 | 110 | 4.87 | 1.15 |
| CE9 | 71 | 192 | 435 | 766 | 165 | 2.73 | 1.84 |

TABLE 3-continued

| PCE type | $M_n$ (× 1000 g/mol) | $M_w$ (× 1000 g/mol) | $M_z$ (× 1000 g/mol) | $M_{z+1}$ (× 1000 g/mol) | $M_v$ (× 1000 g/mol) | Dispersity $M_w/M_n$ | Intrinsic Viscosity (dL/g) |
|---|---|---|---|---|---|---|---|
| CE10 | 48 | 90 | 152 | 235 | 84.9 | 1.86 | 1.11 |
| CE14 | 63 | 248 | 664 | 1,096 | 192 | 3.96 | 1.88 |
| CE15 | 59 | 206 | 526 | 881 | 163 | 3.47 | 1.70 |
| CE20 | 31 | 168 | 611 | 1,094 | 116 | 5.41 | 1.19 |

Some of the polymeric crosslinking enhancers were also analyzed to determine melt flow index at different ASTM D-1238 conditions, and also to determine density (at room temperature) using heptane displacement in a Toyoseiki densimeter. The results of these analysis appears in Table 4 below.

TABLE 4

| PCE type | Melt Flow Index (dg/min) | | | Density (g/cc) |
|---|---|---|---|---|
| | 2.16 kg/190° C. | 10.0 kg/190° C. | 2.16 kg/230° C. | |
| CE2 | 1.33 | 11.30 | 2.69 | 0.878 |
| CE3 | 0.29 | 5.35 | 0.80 | 0.877 |
| CE4 | 1.43 | 10.33 | 2.98 | 0.873 |
| CE5 | 0.14 | 1.66 | 0.28 | 0.839 |
| CE6 | 0.08 | 0.99 | 0.15 | 0.879 |
| CE7 | 0.23 | 5.05 | 0.56 | 0.874 |
| CE9 | 0.10 | 2.98 | 0.22 | 0.879 |
| CE10 | 4.06 | 27.40 | 7.48 | 0.879 |
| CE14 | 0.01 | 0.41 | 0.03 | 0.870 |
| CE15 | 0.02 | 0.72 | 0.05 | 0.868 |
| CE20 | 0.16 | 3.78 | 0.46 | 0.873 |

EXAMPLE 1–16

Sixteen monolayer films in accordance with the invention were extrusion cast. Each film was then exposed to electron beam irradiation, at a given power setting (beam current), in an E-beam irradiation unit. By adjusting the power settings one can directly change the dosage received. Thus, the beam current is substantially directly proportional to received dosage. The process was repeated twice with additional samples of each film, but at different power settings (different radiation dosage). The composition of these films, and two comparative films (COMP. A and B) produced in the same manner, are given in Tables 5 and 6 below. Each film had a thickness of about 12 mils.

TABLE 5

| Example | Film Structure |
|---|---|
| COMP. A | 100% PE1 |
| 1 | 90% PE1 + 10% CE7 |
| 2 | 90% PE1 + 10% CE3 |
| 3 | 90% PE1 + 10% CE4 |
| 4 | 90% PE1 + 10% CE2 |
| 5 | 90% PE1 + 10% CE5 |
| 6 | 90% PE1 + 10% CE6 |
| 7 | 90% PE1 + 10% CE9 |
| 8 | 90% PE1 + 10% CE10 |

TABLE 6

| Example | Film Structure |
|---|---|
| COMP.B | 100% PE2 |
| 9 | 90% PE2 + 10% CE7 |
| 10 | 90% PE2 + 10% CE3 |
| 11 | 90% PE2 + 10% CE4 |
| 12 | 90% PE2 + 10% CE2 |
| 13 | 90% PE2 + 10% CE5 |
| 14 | 90% PE2 + 10% CE6 |
| 15 | 90% PE2 + 10% CE9 |
| 16 | 90% PE2 + 10% CE10 |

Figure 9:
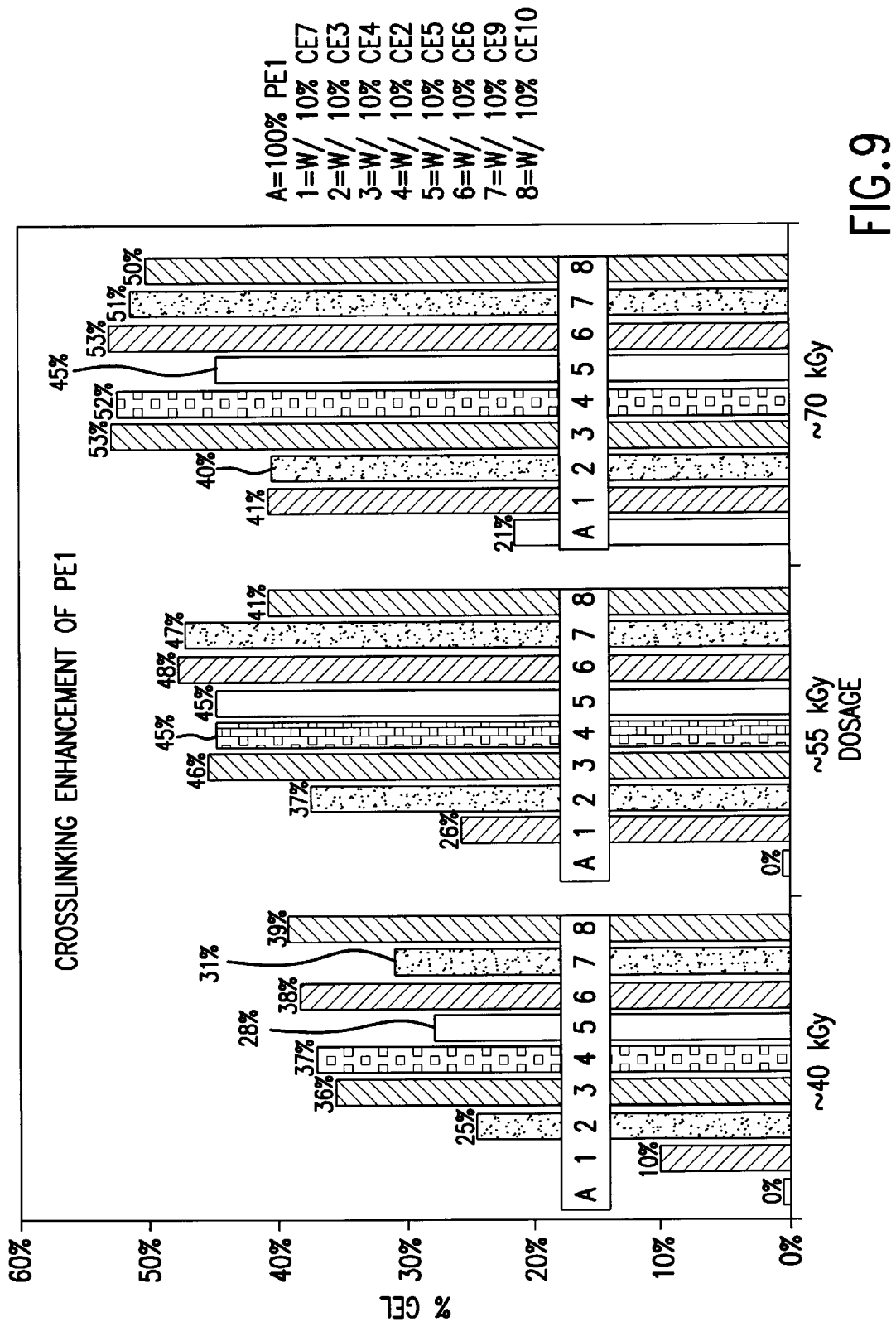
FIGS. 9 through 12 are bar graphs comparing films of the present invention to other films.
Figure 10:
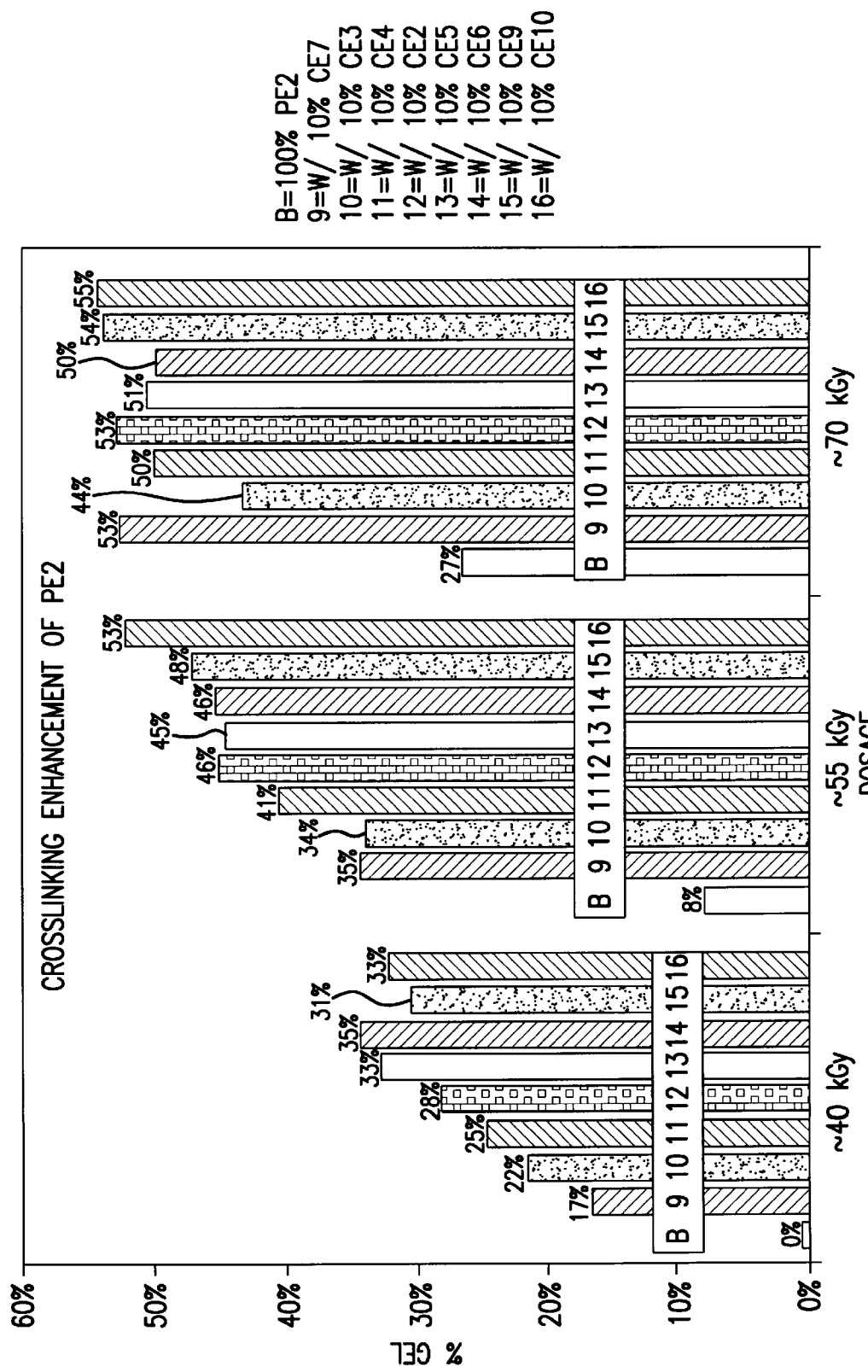

FIGS. 9 and 10 provide bar graphs depicting the received dosage, in KGy, versus the gel % determined for each film sample. Numerals in the drawing correspond to the respective samples. It can be seen that very substantial improvements in crosslinking efficiency (values shown at the top of each bar), as measured by % gel, are obtained by films of the present invention when compared to a control film of LDPE.

EXAMPLE 17–28

Seven three-layer films, and one control film (COMP. BB) were cast coextruded to produce a substrate. In each case, the substrate was exposed to electron beam irradiation, at a dosage of about 50 kGy, in an irradiation unit. After irradiation of the substrate, four additional layers were added to the substrate by simultaneous extrusion coating process. The resulting seven-layer films was then oriented by conventional trapped bubble method to produce crosslinked heat shrinkable films. The composition of these films is given in Table 7 below. The thickness (in mils) of each layer of the film of Example 17 was measured, before orientation, and was determined to be:

| layer 1 | layer 2 | layer 3 | layer 4 | layer 5 | layer 6 | layer 7 |
|---|---|---|---|---|---|---|
| 4.9 | 13.2 | 1.0 | 1.8 | 1.0 | 2.9 | 1.7 |

After orientation, the final thickness of the film of Example 17 was 2.7 mils.

In a similar manner, the thickness (in mils) of each layer of the films of Examples 18 to 23 and COMP.BB was measured, before orientation and was determined to be:

| layer 1 | layer 2 | layer 3 | layer 4 | layer 5 | layer 6 | layer 7 |
|---|---|---|---|---|---|---|
| 54 | 9.8 | 1.0 | 1.9 | 1.0 | 2.6 | 1.8 |

After orientation, the final thickness of the film of each of Example 18 to 23 was 2.2 mils.

In each film, layer 1 would preferably form the food or product contact layer, and sealant layer, for a typical packaging application. The composition of each layer of the films is given in Table 7 below. The double slash (//) indicates where a substrate is adhered to an extrusion coated layer.

TABLE 7

| EXAMPLE | STRUCTURE |
|---|---|
| COMP.BB | PEB3/PE2/EV1//OB1/EM1/PE7/PEB2 |
| 17 | PE5/CEB1/EV1//OB1/EM1/PE7/PEB2 |
| 18 | PEB3/CEB2/EV1//OB1/EM1/PE7/PEB2 |
| 19 | PEB3/CEB1/EV1//OB1/EM1/PE7/PEB2 |

TABLE 7-continued

| EXAMPLE | STRUCTURE |
|---|---|
| 20 | PEB3/CEB3/EV1//OB1/EM1/PE7/PEB2 |
| 21 | PEB3/CEB4/EV1//OB1/EM1/PE7/PEB4 |
| 22 | PEB3/CEB5/EV1//OB1/EM1/PE7/PEB4 |
| 23 | PEB5/CEB4/EV1//OB1/EM1/PEB6/PEB6 |

Some of the film formulations, and COMP.BB, were rerun at four different dosage levels of E-Beam irradiation in an irradiation unit to evaluate the gel % as a function of level of irradiation. Table 7A shows the dosage received, in KGy, versus the gel % determined for these selected films. The % gel was in each example determined for the substrate (layers 1 to 3).

TABLE 7A

| | Gel % | | | |
|---|---|---|---|---|
| EX. | @ 30 kGy | @ 44 kGy | @ 57 kGy | @ 71 kGy |
| COMP. BB | 0 | 0 | 0 | 10 |
| 18 | 0 | 8 | 15 | 21 |
| 19 | 0 | 7 | 13 | 21 |
| 20 | 0 | 6 | 14 | 21 |

EXAMPLES 24–29

Figure 11:
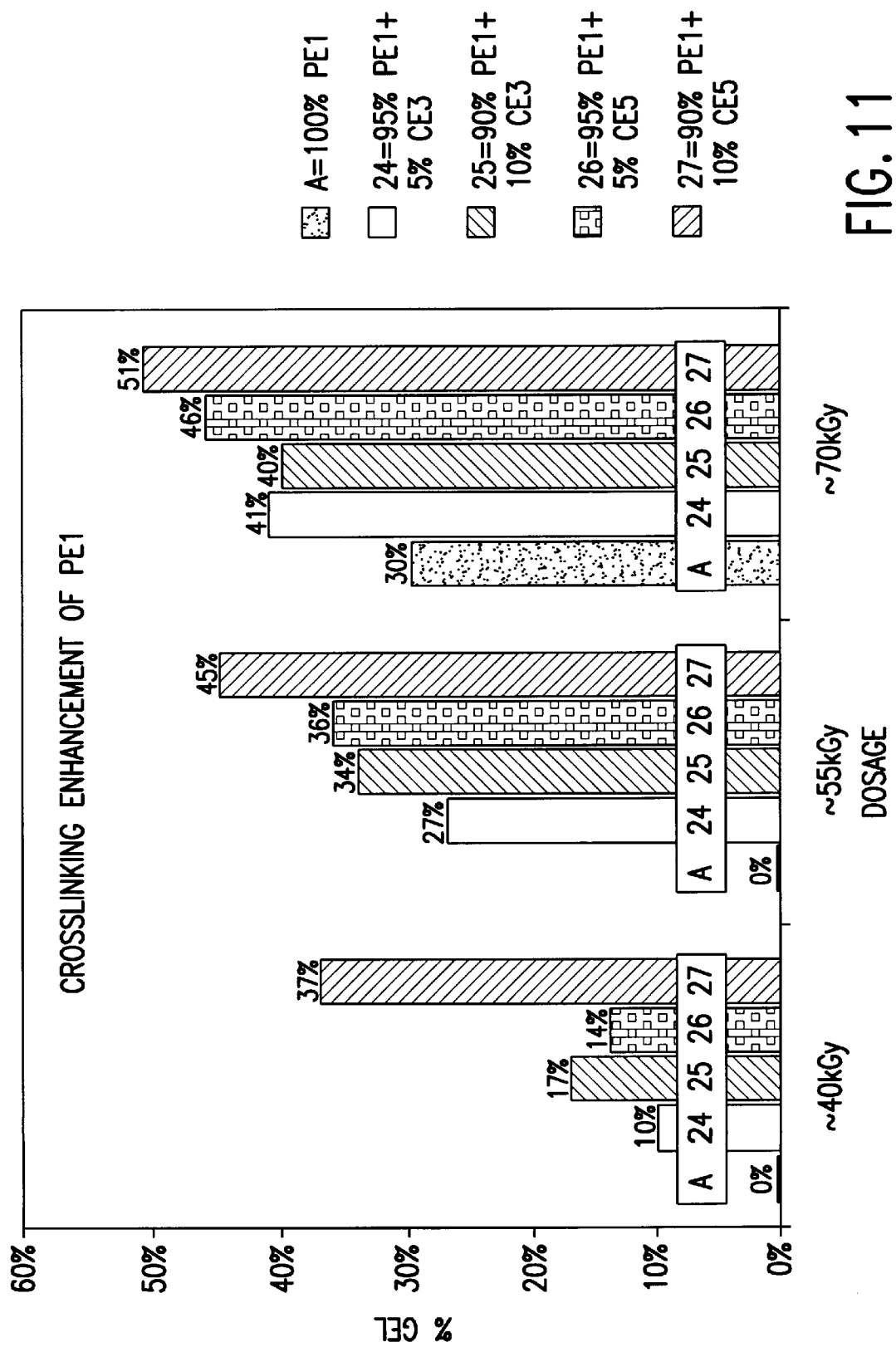

Six monolayer films were extrusion cast, and then exposed to electron beam irradiation, at a given power setting (beam current), in an E-beam irradiation unit. The process was repeated with additional samples of each film, but at two different power settings. The composition of these films, and the three comparative films (COMP. A, B, and C) produced in the same manner, are given in Tables 8 and 9. FIG. 11, with respect to the samples of Table 8, and FIG. 12, with respect to the samples of Table 9, graphically show the received dosage, in kGy, versus the gel % determined for each film example.

TABLE 8

| Example | Film Structure |
|---|---|
| COMP. A | 100% PE1 |
| 24 | 95% PE1 + 5% CE3 |
| 25 | 90% PE1 + 10% CE3 |
| 26 | 95% PE1 + 5% CE5 |
| 27 | 90% PE1 + 10% CE5 |

TABLE 9

| Example | Film Structure |
|---|---|
| COMP.B | 100% PE2 |
| 28 | 90% PE2 + 10% CE5 |
| COMP. C | 100% PE8 |
| 29 | 90% PE8 + 10% CE5 |

Figure 12:
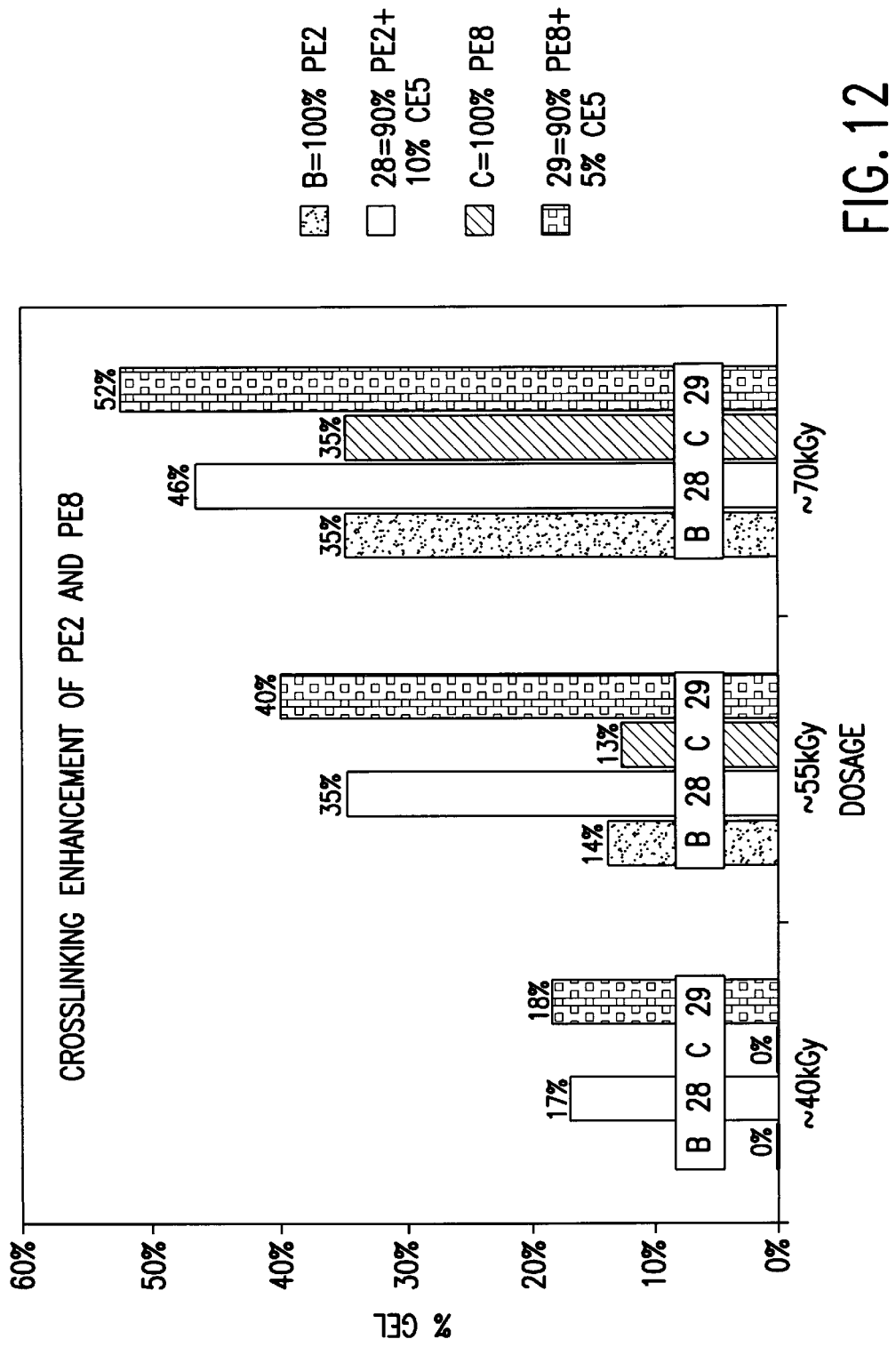

The bar graphs of FIGS. 11 and 12 clearly show that one achieves higher crosslink efficiency with the films of the present invention than the comparative films of examples Comp. A, B and C.

Preparation and Characterization of Representative Advanced Unsaturated Poly(olefins) (AUPO's)

EXAMPLE 30

Polymerizations listed in Tables 10 and 11 herein below were each conducted in a 2 L stainless steel autoclave reactor equipped with an overhead helical impeller at either 50° C. and 50 psig ethylene or 75° C. and 60 psig ethylene using bis(cyclopentadienyl)zirconium(IV)dichloride ($Cp_2ZrCl_2$) and methylaluminoxane (MAO) in dry, degassed toluene. The reactor was charged with toluene (300 to 1300 g), 1-hexene (50 to 200 g) or norbornene (10–100 g), diene (0.1 to 20 g), and MAO (2 to 20 g of MAO/toluene solution containing 10 wt % Al), and saturated with ethylene at either 50° C. and 50 psig or 75° C. and 60 psig. The polymerization was commenced by addition of the metallocene catalyst (0.1 to 3 mg $Cp_2ZrCl_2$ in 10 mL toluene) to the reactor and the polymerizations were allowed to proceed for 0.5 to 2 hours. The reactor was quickly vented and the contents discharged into methanol, filtered and dried. Tables 10 and 11 show the amount and type of starting materials, and the amount and type of polymers, made by this procedure. "E" herein means ethylene, "H" herein means 1-hexene, and "NB" herein means norbornene. A-1 through A-8 represent polymers produced in each of eight polymerization reactions in accordance with the above-described procedure.

TABLE 10

| | Ethylene/1-Hexene/Polyene Copolymer | | | | | |
|---|---|---|---|---|---|---|
| | A-1[a] | A-2[a] | A-3[a] | A-4[a] | A-5[a] | A-6[a] |
| toluene (grams) | 300 | 300 | 500 | 506 | 746 | 754 |
| 1-hexene (grams) | 64 | 67 | 108 | 112 | 178.4 | 175 |
| diene (type) | ENB | ENB | 5-VNB | 5-VNB | 5-VNB | ENB |
| diene (grams) | 3.3 | 9.6 | 5.1 | 15.1 | 8.3 | 8.7 |

TABLE 10-continued

| | Ethylene/1-Hexene/Polyene Copolymer | | | | | |
|---|---|---|---|---|---|---|
| | A-1[a] | A-2[a] | A-3[a] | A-4[a] | A-5[a] | A-6[a] |
| MAO (grams) | 3.0 | 2.0 | 2.0 | 2.0 | 7.5 | 7.5 |
| catalyst (mg) | 0.25 | 0.38 | 0.25 | 1.0 | 0.38 | 0.5 |
| reaction time (hours) | 0.5 | 2.0 | 1.7 | 1.7 | 1.5 | 1.7 |
| polymer (type) | E-H-ENB | E-H-ENB | E-H-VNB | E-H-VNB | E-H-VNB | E-H-ENB |
| polymer (grams) | 46 | 52 | 65 | 50.4 | 104 | 109 | a) 50 psig ethylene and 50° C.

TABLE 11

| | Ethylene/Norbornene/Polyene Copolymer | |
|---|---|---|
| | A-7[b] | A-8[b] |
| toluene(grams) | 1285 | 1235 |
| NB (grams) | 76 | 65 |
| diene (type) | VNB | VNB |
| diene (grams) | 4.3 | 16.5 |
| MAO (grams) | 15 | 12 |
| catalyst (mg) | 2.8 | 1.4 |
| reaction time (hours) | 2.0 | 1.2 |
| polymer(type) | E-NB-VNB | E-NB-VNB |
| polymer (grams) | 103 | 76 | b) 60 psig ethylene and 75° C.

The AUPO's described above were found to be compositionally pure as indicated by a single melting endotherm by differential scanning calorimetry (DSC) at 10° C. per minute and with narrow polydispersities by gel permeation chromatography (GPC). Table 12 summarizes the characterization of the terpolymers.

TABLE 12

| AUPO | A-1 | A-2 | A-3 | A-4 | A-5 | A-6 |
|---|---|---|---|---|---|---|
| Density (g/cc) | 0.913 | 0.919 | 0.906 | 0.915 | 0.908 | 0.909 |
| Mol % H | 5.1 | 3.7 | 5.5 | 4.5 | 5.4 | 5.1 |
| Mol % diene | 1.2 | 2.2 | 0.8 | 1.9 | 0.9 | 1.1 |
| | (ENB) | (ENB) | (VNB) | (VNB) | (VNB) | (ENB) |
| $T_m$ (° C.) | 90 | 91 | 91 | 96 | 93 | 93 |
| $\Delta H_f$ (J/g) | 60 | 40 | 50 | 60 | 70 | 70 |
| $I_2$ (dg/min) | 2.8 | 6.3 | 0.6 | 4.6 | 4.5 | 10.5 |
| $M_w \times 10^3$ (grams/mole) | 81 | 68 | 124 | 70 | nd | nd |
| $M_w/M_n$ | 1.9 | 1.9 | 1.9 | 1.9 | nd | nd |

To further illustrate the breadth of the invention, copolymers of ethylene and norbornene, as well as unsaturated terpolymers based on these monomers with VNB (at two different levels) were also prepared. An ethylene-norbornene copolymer was prepared in a 20 gallon jacketed stainless steel autoclave equipped with baffles and an overhead turbine-style stirrer. The reactor was charged with 48.1 kg of toluene containing 0.2 wt % MAO, 4.2 kg of norbornene solution (65 wt % in toluene) and heated to 75° C. and pressurized to 60 psig ethylene. After the system equilibrated, the polymerization was initiated by addition of a total of 38 mg of $Cp_2ZrCl_2$ and ethylene was fed in on demand. The polymerization was allowed to proceed for 4.25 hours. It was then terminated by addition of 100 mL of methanol. The reactor was vented, the contents discharged and precipitated into methanol and the polymer filtered and dried in a vacuum oven. 7.1 kg of polymer was isolated. The polymer (A9) had an MFI (190° C. and 2.16 kg) of 1.7 dg/min with a Tm of 75° C. The polymer was found, by carbon-13 NMR, to contain 10 mol % NB and the microstructure was consistent with an addition polymerization with NB monomer inserted without ring-opening. The reaction conditions for the unsaturated E-NB terpolymers A-7 and A-8 is listed in Table 11 and the characterization of these materials A-7; A-8 and A-9 are listed in Table 13.

TABLE 13

| AUPO | A-7 | A-8 | A-9 |
|---|---|---|---|
| Density (g/cc) | 0.958 | 0.952 | 0.958 |
| Mol % NB | 14.0 | 11.2 | 10.0 |
| Mol % diene | 0.2 | 0.9 | 0 |
| | (VNB) | (VNB) | |
| $T_m$ (° C.) | 65 | 68 | 75 |
| $I_2$ (dg/min) | 13.5 | 3.9 | 1.7 |
| $M_w \times 10^3$ (grams/mole) | 103 | 63 | 112 |
| $M_w/M_n$ | 2.3 | 1.8 | 2.4 |

The resins listed above were found to contain 0% gel prior to exposure to electron-beam radiation. To further explore the utility of AUPO's as crosslinking enhancers, blends containing said materials (10% unsaturated resin) were prepared on a Brabender mixing chamber with a LLDPE (Dowlex 2045.14 of Dow Chemical Co.); 6.5 wt % octene, (0.920 g/cc, 1.0 dg/min). These blends were:

PEB7=90% PE9+10% CE5
PEB8=90% PE9+10% A5
PEB9=90% PE9+10% A6
PEB10=90% A10+10% CE5

The effect of electron-beam irradiation on the AUPO resins and their blends is shown in Table 14. The data clearly shows that VNB is a more efficient diene at promoting crosslinking than ENB, and that high levels of crosslinking could be achieved using these AUPO's either alone or as a crosslinking enhancer to improve the crosslinking in other resins. It also clearly shows that the AUPO resins, as a component of a blend, enhanced the crosslinking of LLDPE giving higher gel contents at lower doses than the base resin.

TABLE 14

Gel Content of AUPO Crosslink Enhancers and Their Blends

| | Dose(kGray) | |
|---|---|---|
| Resin | 37 | 70 |
| A1 (E-H-ENB) | 46.9 ± 1.9 | 74.4 ± 6.3 |
| A2 (E-H-ENB) | 45.0 ± 8.3 | 66.9 ± 4.3 |
| A3 (E-H-5VNB) | 66.3 ± 3.5 | 83.0 ± 4.0 |
| A4 (E-H-5VNB) | 60.7 ± 3.7 | 78.1 ± 0.9 |
| A5 (E-H-5VNB) | 37.2 ± 12.1 | nd |
| A6 (E-H-ENB) | nd | nd |
| PE9 (LLDPE) | 0 | 15 |
| PEB7 (EPDM) | 24.0 ± 4.1 | 25.7 ± 7.3 |
| PEB8 (E-H-5VNB) | 21.4 ± 4.1 | 37.2 ± 12.1 |
| PEB9 (E-H-ENB) | 30 | 45.6 ± 3.5 |

Table 14 demonstrates that AUPO type PCE copolymers (A1–A5) can be employed on their own to generate highly crosslinked films, and to enhance crosslinking (PEB8 and PEB9) in other resins.

TABLE 15

% Gel Content of E-NB Co-(Ter)polymers as a Function of Dose

| Dose (kGray) | 35 | 70 | 100 |
|---|---|---|---|
| A9 | 0 | 3 | 35 |
| PEB10 | 5 | 19 | 37 |
| A7 | 3 | 43 | 50 |
| A8 | 51 | 73 | 80 |

Table 15 clearly shows that enhanced crosslinking of E-NB copolymers can be achieved by blending in a PCE copolymer of the present invention or by copolymerization with a diene monomer. The level of diene determines the extent to which the crosslinking can be enhanced.

Films formed with at least one layer containing the subject PCE composition and subjected to irradiation, as described herein above and illustrated by Examples 1–30 above, are particularly useful in the production of bags for packaging fresh red meat, smoked and processed meat, pork, cheese, poultry, and the like, as described in e.g. U.S. Pat. Nos. 3,741,253 (Brax et al.), 3,891,008 (D'Entremont), 4,048,428 (Baird), and 4,284,458 (Schirmer), all incorporated by reference herein in their entirety. However, the film can also be used in other applications. For example, the film can be used as a shrink film in packaging applications for packaging food and non-food items. Films in which the present invention can be beneficially used are described in e.g. U.S. Pat. Nos. 4,551,380 and 4,643,943, both to Schoenberg, and both incorporated by reference herein in their entirety. In addition, the present invention can also be used with films having oxygen, moisture, or odor barrier functionality, as described in e.g. U.S. Pat. Nos. 4,064,296 (Bornstein et al.), 4,724,185 (Shah), 4,839,235 (Shah), and 5,004,647 (Shah), all incorporated by reference herein in their entirety.

EXAMPLE 31–34

Four oxygen barrier films were formed with layers of PCE copolymer of the present invention (Examples 31 and 34) as well as a comparative control film (COMP.D). Each had the layer structure:

A/B/C/D/C/B/A

These films were made by a coextrusion of the layers, and each film was irradiated and oriented. A small amount of anhydrous aluminum silicate (an antiblock) and mono- and diglyceride/propylene glycol (an antifog) were compounded into the resin blend of the two outside layers, such that, after compounding, the additives comprised about 6% of the total compounded blend.

The film of COMP.D was compositionally and structurally as shown below:

| 50% PE9 | PE10 | 90% OB2 | | 50% PE9 |
|---|---|---|---|---|
| 25% PE10 | | AD1 | AD1 PE10 | 25% PE10 |
| 25% EV4 | | 10% PA1 | | 25% EV4 |

The films of Examples 31 and 32 had the same general formulation as shown above for COM.D except that the second and sixth layers (the "B" layers) comprised 90% PE10+10% CE3.

The film of Examples 33 and 34 had the same general formulation as shown above for COMP.D except that the third and fifth layers (the "C" layers) comprised 90% AD1+10% CE3.

Data comparing the power settings of the E-Beam irradiation unit and MFI of these examples is given in Table 16 herein below.

TABLE 16

| Example | Beam Current (mA) | Melt Flow Index (dg/min.) |
|---|---|---|
| COMP. D | 15.0 | 6.3 |
| 31 | 12.2 | 6.4 |
| 32 | 15.0 | 3.7 |
| 33 | 9.0 | 14.4 |
| 34 | 12.0 | 5.9 |

A review of the data of Table 16 shows two benefits of the present invention.

First, the data shows that two films with identical composition and structure (COMP.D and Example 32), except for the presence of 10% of a crosslinking enhancer in the B layers of Ex. 32, were irradiated at the same dosage, yet had very different MFI values. The lower MFI value of Ex. 32 reflects the increased crosslinking of the film of Ex. 32 as the result of the presence of the crosslinking enhancer. As pointed out in the description of the invention, crosslinking improves processability in making oriented films.

Secondly, the data shows that two films with identical composition and structure (COMP.D and Example 31), except for the presence of 10% of a crosslinking enhancer in the B layers of Ex. 31, had nearly the same MFI (6.3 vs. 6.4) even though the film of Ex. 31 had been irradiated at a power setting of only 12.2 mA, compared with the higher power setting of 15.0 for COMP.D. Again, as pointed out in the description section of this specification, higher levels of crosslinking generally degrade the performance of sealing layers. By lowering the power setting of irradiation to which the extruded tape is exposed, the flowability of the sealant is less severely affected, and the sealant will perform better.

EXAMPLE 35

Films formed according to the present invention were prepared for use as or in connection with a patch as described in e.g. U.S. Pat. No. 4,755,403 (Ferguson) the teachings incorporated by reference herein in its entirety. An exemplary patch structure was made having the formulation:

| | | | | |
|---|---|---|---|---|
| 87% PE1 | | | 87% PE1 | |
| 10% CE2 | EV3 | EV3 | 10% CE2 | |
| 3% EV1 | | | 3% EV1 | |

This patch material was a tubular patch self-welded to itself at the // interface. It was coextruded, and irradiated at a dosage of 98 kGy. The patch thickness after orientation was 4.5 mils. The patch film was oriented and rendered heat shrinkable. This material can be used alone, or as a patch for a bag or other film.

For comparative purposes, a tubular patch film was formed by coextrusion in the same manner as the above exemplary patch of the present invention. The film was also irradiated with E-Beam at a dosage of 98 kGy and oriented by stretching to a thickness of 4.5 mils. In the case of this control film the layer structure was:

| | | | | |
|---|---|---|---|---|
| 90% PE1 | | | 90% PE1 | |
| 10% EV2 | EV3 | EV3 | 10% EV2 | |

The two patch materials were measured for gel % and it was determined that the exemplary film had a gel % of 55.0% while the comparative film had a gel % of only 46.5%.

EXAMPLE 36

Films were formed in which the outer layer was crosslinked by UV irradiation. The films contained unsaturated block copolymers in combination with a second polymer. The polymers were compounded in a Brabender mixing chamber, pressed to make pressed-film samples, or plaques, and exposed to a low intensity UV source (Amergraph lamp, primarily UVA output) for ten minutes at room temperature in the solid state. At ten minutes the Amergraph radiometer measurement was 1600 mJ/sq cm at 365 nm.
Unsaturated polymer additive The blends were: 69% by weight of an ethylene/vinyl acetate resin having 9% by weight vinyl acetate (EVA 9) and 29% by weight of an unsaturated polymer and 2% by weight of benzophenone. The unsaturated polymers were Kraton® D1107, a linear styrene-isoprene-styrene triblock copolymer available from Shell (Sample A); Kraton D1102, a linear styrene-butadiene-styrene triblock copolymer available from Shell (Sample B); and Stereon® 840, a styrene-butadiene block polymer available from Firestone, Akron, Ohio (Sample C). Gel content was analyzed as above.

TABLE 17

Gel Content Data

| | |
|---|---|
| Sample A | 30% |
| Sample B | 6% |
| Sample C | 3% |

The only unsaturated block copolymer to yield significant gel levels was Sample A, the styrene-isoprene-styrene block copolymer. However, the styrene-butadiene-styrene block copolymer did not yield significant gel content under these conditions.

Comparative Example

For comparative purposes, a chemically crosslink polymer composition was formed and exposed to UV radiation in the same manner as Sample A above. EVA9 resin was compounded with 2 weight percent of triallylcyanurate (TAC) and 2 weight percent of benzophenone as initiator. The material formed was labeled "Sample G". The gel content of this Sample G was 26% and, therefore, similar in crosslink as that of Sample A.

Samples A and G were selected for extrusion in multilayer test films. Sample G was found to be difficult to extrude due to blooming and bleeding (separation of one component so that it selectively appears on the surface of the extrudate) of the TAC. To obtain a sample, 50 weight percent of ethylene/vinyl acetate with 9% vinyl acetate was added. In comparison, Sample A did not exhibit blooming.

Further, films were formed having multiple layers as follows. EVA-9 resin and an ethylene/vinyl acetate resin with 15% vinyl acetate (EVA15) were coextruded as a bilayer annular tape, electronically crosslinked, and cooled. The tape was then coated by coextruding three more layers, a Saran/PVDC barrier layer blend, and ethylene/vinyl acetate with 28% vinyl acetate layer, and a layer of the resin of Samples A or G. The Saran/PVDC layer was in contact with the EVA 15 layer, and the Sample resins were located on the outside. The tapes were UV irradiated using lamps from Fusion Systems, Inc., Rockville, MD. The doses were 450 and 900 mJ/sq. cm. The tape was then biaxially oriented (stretched) at a racking ratio of about 3× in the transverse direction and about 4× in the longitudinal direction. Gel content of the outside layer was then determined and is reported below. The gel content from Sample A was higher than from Sample G. The film from Sample A was tested and showed no tendency for film "pick-off" during the sealing process, had excellent grease resistance and good optics.

TABLE 18

Irradiated Film Samples

| Crosslinked Layer | Dose, mj/sq. cm. at 360 nm | % Gel |
|---|---|---|
| Sample A | 450 | 20 |
| Sample A | 900 | 66 |
| Sample G | 450 | 0 |
| Sample G | 900 | 0 |

These examples demonstrate a UV system that produces a crosslinked network. The resulting film dose can eliminate applied seal delamination, increase grease resistance, and still maintain good optics. These results also show that the films having the present PCE composition performed significantly better than films which were chemically crosslinked.

EXAMPLE 37

Benzophenone was dissolved in low molecular weight 1,2-polybutadiene (1,2-PBD) with gentle warming. The liquid was poured onto pellets of LLDPE and was evenly distributed by tumble mixing to provide a PCE composition. The final composition was 5% by weight 1,2-PBD and 1% by weight benzophenone. The apparatus in FIG. 1 was used to extrude and irradiate the mixture. The lamp was positioned directly above the die lip. Linear extrusion rate was varied by varying a combination of extruder rpm and take-up speed. Gel content of the resulting film was determined as described above. The results are reported in Table 19 below.

TABLE 19

Gel Content Data - Linear Low Density Polyethylene

| Linear Extrusion Rate (ft./min.) | Gel Content (% by wt.) | Film Thickness (mil) |
|---|---|---|
| 2.66 | 50 | 11.4 |
| 2.83 | 45 | 8.1 |
| 8.50 | 22 | 6.6 |

These data demonstrate that useful gel contents can be achieved in polyethylene by this process. These data also show that 1,2-polybutadiene is as effective as TAC as a crosslinking aid. In addition, high gel contents can be achieved in relatively thick films. These films gave 0% gel content in the absence of UV.

EXAMPLE 38

This example was carried out exactly like that in Example 37, except that LLDPE polymer was substituted with an ethylene-propylene copolymer (having 3.1% ethylene). The following data were obtained:

TABLE 20

Gel Content for EP Copolymer

| Linear Extrusion Rate (ft./min.) | Gel Content (% by wt.) | Film Thickness (mil) |
|---|---|---|
| 2.8 | 37 | 7.1 |
| 5.7 | 19 | 7.4 |
| 9.0 | 7 | 9.2 |

These data show that useful crosslinking can be obtained by this method in propylene copolymers.

EXAMPLE 39

The same equipment and method described in Example 37 was also used in this example except that the 1,2 PBD polymer was substituted with a developmental LLDPE copolymer composed of ethylene/octene/polyene having 430 C=C per 100,000 carbon atoms, in the form of terminal vinyl unsaturation by IR analysis. With the addition of 1% benzophenone, this PCE composition gave a gel content of 90% when extruded at a linear rate between 2 and 3 ft./min. and irradiated with UV irradiation. Again there was no gel content in the absence of UV irradiation.

EXAMPLE 40

In this example, two formulations were prepared in a Brabender mixing chamber by melt blending the components to compare chemically crosslinked material to that of the present invention. The first formulation was commercially available LLDPE (Attane 4201) with 1% triallylcyanurate (TAC) and 1% benzophenone. The second was the developmental unsaturated LLDPE copolymer described in Example 39 above, with 1% benzophenone. A 10 inch Fusion Systems lamp (H-bulb) mounted on a conveyor belt was used to irradiate pressed films of the above formulations (15–20 mil thick) at room temperature (UV doses measured at 365 nm). The following results were obtained:

TABLE 21

Gel Content at Various UV Doses in the Solid State

| Formulation | UV Dose (J/cm$^2$ @ 365 nm) | Gel Content (% by wt) |
|---|---|---|
| Attane 4201, 1% TAC, 1% benzophenone | 0.2 | 0.0 |
| Attane 4201, 1% TAC, 1% benzophenone | 0.4 | 1.4 |
| Attane 4201, 1% TAC, 1% benzophenone | 0.6 | 1.7 |
| unsaturated LLDPE, 1% benzophenone | 0.2 | 19.6 |
| unsaturated LLDPE, 1% benzophenone | 0.4 | 25 |
| unsaturated LLDPE, 1% benzophenone | 0.8 | 41 |

These data show that a high degree of crosslinking was not obtained for chemical system with TAC in the solid state; however, the PCE copolymer (developmental unsaturated LLDPE), a high degree of crosslinking was obtained in the solid state at relatively low doses of UV radiation. These data when combined with the previous examples, further demonstrate that even higher gel contents for a given system can be obtained when irradiation occurs in the melt state.

EXAMPLE 41

In this example, a PCE copolymer was prepared by grafting. In a Brabender mixing chamber, an ethylene-alkyl acrylate-maleic anhydride terpolymer (Lotader 3200, AtoChem Inc.) was melt compounded and reacted with 5% by weight hydroxyl terminated 1,2-PBD (Nisso-PB®, G-3000, Nippon Soda Co., Ltd.). To the formed graft copolymer, 1% benzophenone was further incorporated by melt blending. A pressed film was irradiated at room temperature as described above to a UV dose of 0.8 J/cm$^2$ (measured at 365 nm), which resulted in a gel content of 23% by weight. In contrast, the unirradiated film had a gel content of 0.8% by weight, as a result of the difunctional nature of the 1,2-PBD.

EXAMPLE 42

In this example, two formulations were prepared in a Brabender mixing chamber by melt blending the components. The first formulation was PCE copolymer of developmental unsaturated LLDPE combined with 1% 4-allyloxybenzophenone. The second was the same developmental unsaturated LLDPE with 1%, 4,4'-diallyloxybenzophenone. A 10 inch Fusion Systems lamp (H-bulb) mounted on a conveyor belt was used to irradiate pressed films of the above formulations (15–20 mil thick) at room temperature (UV doses measured at 365 nm). The following results were obtained:

TABLE 22

Gel Content at Various UV Doses in the Solid State

| Formulation | UV Dose (J/cm$^2$ @ 365 nm) | Gel Content (% by wt) |
|---|---|---|
| Unsat. LLDPE, 1% 4-allyloxybenzophenone | 0.2 | 18.5 |
| " | 0.4 | 19.5 |
| " | 0.8 | 18.5 |
| Unsat. LLDPE, 1% 4,4'- | 0.2 | 11.0 |

TABLE 22-continued

Gel Content at Various UV Doses in the Solid State

| Formulation | UV Dose (J/cm² @ 365 nm) | Gel Content (% by wt) |
|---|---|---|
| diallyloxybenzophenone | | |
| " | 0.4 | 22.0 |
| " | 0.8 | 34.7 |

These data show that useful crosslinking can be obtained even in the solid state for polyethylene-polyene copolymer and that useful crosslinking can be obtained from substituted benzophenone.

EXAMPLE 43

Pellets of EVA-9 were coated with a mixture of low molecular weight 1,2-polybutadiene (1,2-PBD) and benzophenone to form a PCE composition. Benzophenone was dissolved in the 1,2-PBD with gentle warming prior to coating. The final composition was 5% by weight 1,2-PBD and 1% by weight benzophenone. The twin screw extruder in FIG. 1 was used to extrude and pelletize the mixture. The resulting pellets were fed into a Randcastle micro-extruder, which had the UV lamp in FIG. 1 mounted at the lip of the 6" flat sheet die. The linear extrusion rate was varied by varying a combination of extruder rpm and take-up speed. Gel content of the resulting film was determined as described above. The following results were obtained:

TABLE 23

Gel Content Data for EVA-9[a]

| Linear Extrusion Rate (ft./min.) | Gel Content (% by wt.) | Film Thickness (mil) |
|---|---|---|
| 8.0 | 28 | 2.1 |
| 11 | 42 | 1.5 |

[a]EVA-9 (polyethylene/vinyl acetate resin with 9% vinyl acetate comonomer LD 318.92 available from Exxon Corp., Houston, TX) compounded with 5% by weight 1,2-PBD and 1% by weight benzophenone and extruded using a Brabender twin-screw extruder.

These data clearly show that PCE compositions containing EVA-9 can be UV crosslinked to high gel contents.

EXAMPLE 44

The Randcastle micro-extruder described above was used to make a three layer film that was irradiated in a similar fashion. The skin layers of the structure were a PCE composition composed of a blend of LLDPE, with 5% by weight 1,2-polybutadiene (1,2-PBD) and 1% by weight benzophenone. The skin layer blend was compounded prior to coextrusion as described above. The core layer of the structure was LLDPE (Dowlex 3010). The approximate ratio of the layer gauges was 1:1:1 based on the extruder rpm.

TABLE 24

LLDPE[a]/LLDPE[b]/LLDPE[a]

| Linear Extrusion Rate (ft./min.) | Total Gel Content (% ± 2σ) | Skin Gel Content[c] (% ± 2σ) | Film Thickness (total, mil) |
|---|---|---|---|
| 4.5 | 21 ± 7 | 32 ± 11 | 6.7 |
| 8.0 | 24 ± 4 | 36 ± 6 | 3.7 |

TABLE 24-continued

LLDPE[a]/LLDPE[b]/LLDPE[a]

| Linear Extrusion Rate (ft./min.) | Total Gel Content (% ± 2σ) | Skin Gel Content[c] (% ± 2σ) | Film Thickness (total, mil) |
|---|---|---|---|
| 11 | 20 ± 2 | 30 ± 3 | 2.9 |

[a]Skin layer LLDPE is Dowlex 2045.03 with 5% 1,2-PBD and 1% Benzophenone, twin screw compounded prior to coextrusion.
[b]Middle layer LLDPE is Dowlex 3010.
[c]Approximate gel content of skin layers calculated assuming ⅔ of structure.

These data clearly indicate that the skin layers of a multilayer film can be substantially crosslinked by UV irradiation.

EXAMPLE 45

The Randcastle micro-extruder described in Example 43 was used to make a three layer film that was irradiated as in Example 8. The skin layers of this structure were LLDPE (Dowlex 3010, Dow Chemical). The core layer of the structure was a PCE composition composed of a blend of LLDPE (Dowlex 2045.03, Dow Chemical) with 5% 1,2-PBD (Nisso PB®, B-1000, Nippon Soda Co., Ltd.) and 1% acrylated benzophenone derivative (Ebecryl® P-36, UCB Radcure Inc.), that was compounded prior to coextrusion as described in Example 7. The approximate ratio of the layer gauges was 1:1:1 based on the extruder rpm.

TABLE 25

LLDPE[a]/LLDPE[b]/LLDPE[a]

| Linear Extrusion Rate (ft./min.) | Total Gel Content (% ± 2σ) | Core Gel Content[c] (% ± 2σ) | Film Thickness (total, mil) |
|---|---|---|---|
| 8.0 | 17 ± 4 | 51 ± 12 | 5.5 |
| 14 | 27 ± 5 | 81 ± 15 | 3.8 |

[a]Skin layer LLDPE is Dowlex 3010.
[b]Core layer LLDPE is Dowlex 2045.03 with 5% 1,2-PBD and 1% acrylated benzophenone, twin screw compounded prior to coextrusion.
[c]Approximate gel content of core layer calculated assuming ⅓ of structure.

These data clearly indicate that an internal layer of a multilayer film can be substantially crosslinked by UV with these additives and apparatus.

We claim:

1. A multilayer film having at least one layer of said film containing a PCE composition comprising
   (i) copolymer having polymeric units derived from (a) at least one polyene monomer, (b) at least one $C_2$–$C_{20}$ olefinic monomer and, optionally, (c) at least one copolymerizable monomer other than (a) or (b); or
   (ii) polymer mixture composed of at least one polymer having polymeric units derived from (a) at least one polyene monomer, and at least one polymer having polymeric units derived from (b) at least one $C_2$–$C_{20}$ olefinic monomer and, optionally, at least one copolymerizable monomer other than (a) or (b);
   wherein each of at least one layer formed with PCE composition being crosslinked to a greater degree than at least one other layer of said film and wherein at least one layer forming a major surface of the film is sealable.

2. The film of claim 1 wherein the PCE composition is PCE composition (i).

3. The film of claim 1 wherein the PCE composition is PCE composition (ii).

4. The film of claim 1 wherein the PCE composition further comprises a diluent polymer.

5. The film of claim 1 wherein the polyene of the PCE composition is present in sufficient amount to provide 10 to 25,000 carbon to carbon double bonds per 100,000 carbon atoms contained in the layer having said PCE composition.

6. The film of claim 2 wherein the PCE copolymer (i) has a weight average molecular weight (Mw) of at least about 10,000 daltons.

7. The film of claim 3 wherein the PCE copolymer (ii) has a weight average molecular weight (Mw) of at least 1,000 daltons.

8. The film of claim 1 wherein the PCE composition comprises copolymer (i) and said copolymer is an AUPO copolymer.

9. The film of claim 2 wherein the copolymer is an ethylene/propylene/polyene copolymer.

10. The film of claim 4 wherein the copolymer is an ethylene/propylene/polyene copolymer.

11. The film of claim 8 wherein the copolymer is an ethylene/propylene/polyene copolymer.

12. The film of claim 2 wherein the PCE composition further comprises a photoinitiator compound.

13. The film of claim 3 wherein the PCE composition further comprises a photoinitiator compound.

14. The film of claim 4 wherein the PCE composition further comprises a photoinitiator compound.

15. The film of claim 12 wherein the photoinitiator compound is present in from about 0.1 to 3 weight percent of the layer having the PCE composition.

16. The film of claim 13 wherein the photoinitiator compound is present in from about 0.1 to 3 weight percent of the layer having the PCE composition.

17. The film of claim 14 wherein the photoinitiator compound is present in from about 0.1 to 3 weight percent of the layer having the PCE composition.

18. The film of claim 1 wherein the at least one of said layers containing the PCE composition is an internal layer of the film.

19. The film of claim 8 wherein the at least one of said layers containing the PCE composition is an internal layer of the film.

20. The film of claim 10 wherein the at least one of said layers containing the PCE composition is an internal layer of the film.

21. The film of claim 1 wherein the polyene monomer comprises a non-conjugated polyene.

22. The film of claim 1 wherein the polyene monomer comprises a substituted polyene.

23. The film of claim 1 wherein the polyene monomer comprises a polyene with vinyl unsaturation.

24. The film of claim 1 wherein the polyene monomer comprises a diene.

25. The film of claim 8 wherein the PCE copolymer comprises a single-site catalyzed unsaturated polymeric material and the polyene monomer comprises a polyene with vinyl unsaturation.

26. The film of claim 1 wherein the PCE copolymer comprises semi-crystalline material.

27. The film of claim 1 wherein the polyene monomer is selected from the group consisting of 5-ethylidene-2-norbornene, 5- methylidene-2-norbornene, 5-vinyl-2-norbornene, 5-methylene-2-norbomene, 2,5-norbornadiene, butadiene, isoprene, 1,4-hexadiene, 4-methyl-1,4-hexadiene, 5-methyl-1,4-hexadiene, 4-ethyl-1,4-hexadiene, 1,5-hexadiene, 1,6-heptadiene, 1,4-heptadiene, 1,5-heptadiene, 5-methyl-1,4-heptadiene, 1,4-octadiene, 1,5-octadiene, 1,6-octadiene, 5-ethyl-1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 1,9-decadiene, 6-methyl-1,6-undecadiene, 1,8-nonadiene, 1,13-tetradecadiene, 1,4-dodecadiene, cyclooctadiene, 4-vinylcyclohexene, 1,4-divinylcyclohexane, 1,3-divinylcyclohexene, 1-allyl-4-vinylcyclohexane, 1,4-divinylcyclohexane, 1,3-divinylcyclopentane, 1-allyl-3-vinylcyclopentane, 1,5-divinylcyclooctane, 1-allyl-5-vinylcyclooctane, 1,5-diallylcyclooctane, 1-allyl-4-isopropenylcyclooctane, 1-allyl-4-isopropenylcyclohexane, 1-isopropenyl-3-vinylcyclopentane, 1-allyl-4-isopropenylcyclohexane, 4-vinylcyclohexene, dicyciopentadiene, divinylbenzene, and vinylisopropenylbenzene.

28. The film of claim 1 wherein the $C_2$ to $C_{20}$ olefinic monomer is selected from the group consisting of ethylene, propylene, 1-butene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 3,5,5-trimethylhexene, 1-octene, 1-decene, 1-dodecene, 1-tetradecene, 1-hexadecene, 1-octadecene, and 1-eicosene.

29. The film of claim 1 wherein the additional monomer (c) is selected from the group consisting of vinyl aromatics, cycloolefin monomers, unsaturated esters, unsaturated acids, and salts of unsaturated acids.

30. The film of claim 6 wherein the PCE copolymer (i) has a weight average molecular weight ($M_w$) of at least 20,000 daltons.

31. The film of claim 1 wherein the copolymer of PCE copolymer has a density at 25° C. of between 0.8 and 1.0 g/cc.

32. The film of claim 3 wherein the second polymer of the PCE composition (ii) is selected from the group consisting of polyethylene, ethylene/olefin copolymer, propylene/olefin copolymer, polypropylene, polyvinyl chloride, polyvinylidene dichloride, polybutene, ethylene/acid copolymer, and ethylene/ester copolymer.

33. A multilayer film having at least one layer of said film containing a PCE composition comprising an AUPO copolymer, said AUPO copolymer having polymeric units derived from (a) at least one polyene monomer, (b) at least one $C_2$–$C_{20}$ olefinic monomer and, optionally, (c) at least one copolymerizable monomer other than (a) or (b), each of said at least one layer containing said PCE composition being crosslinked to a greater degree than at least one other layer of said film.

34. The film of claim 33 wherein the copolymer is an ethylene/propylene/polyene copolymer.

35. The film of claim 33 wherein the at least one layer containing the PCE composition is an internal layer of the film.

36. The film of claim 33 wherein at least one layer forming a major surface of the film is sealable.

37. The film of claim 33 wherein the PCE copolymer comprises a single-site catalyzed unsaturated polymeric material and the polyene monomer comprises a polyene with vinyl unsaturation.

38. The film of claim 33 wherein the polyene monomer is selected from the group consisting of 5-ethylidene-2-norbornene, 5-methylidene-2-norbornene, 5-vinyl-2-norbornene, 5-methylene-2-norbornene, 2,5-norbornadiene, butadiene, isoprene, 1,4-hexadiene, 4-methyl-1,4-hexadiene, 5-methyl-1,4-hexadiene, 4-ethyl-1,4-hexadiene, 1,5-hexadiene, 1,6-heptadiene, 1,4-heptadiene, 1,5-heptadiene, 5-methyl-1,4-heptadiene, 1,4-octadiene, 1,5-octadiene, 1,6-octadiene, 5-ethyl-1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 1,9-decadiene, 6-methyl-1,6-undecadiene, 1,8-nonadiene, 1,13-tetradecadiene, 1,4-dodecadiene, cyclooctadiene, 4-vinylcyclohexene, 1,4-divinylcyclohexane, 1,3-divinylcyclohexene, 1-allyl-4-vinylcyclohexane, 1,4-divinylcyclohexane, 1,3-divinylcyclopentane, 1-allyl-3-vinylcyclopentane, 1,5-divinylcyclooctane, 1-allyl-5-vinylcyclooctane, 1,5-diallylcyclooctane, 1-allyl-4-isopropenylcyclooctane, 1-allyl-4-isopropenylcyclohexane, 1-isopropenyl-3-vinylcyclopentane, 1 -allyl-4-isopropenylcyclohexane, 4-vinylcyclohexene, dicyclopentadiene, divinylbenzene, and vinylisopropenylbenzene.

39. A multilayer film having at least one layer of said film containing a PCE composition comprising an ethylene/propylene/polyene copolymer each of said at least one layer formed with PCE composition being crosslinked to a greater degree than at least one other layer of said film.

40. The film of claim 39 wherein the PCE copolymer (i) has a weight average molecular weight (Mw) of at least about 10,000 daltons.

41. The film of claim 39 wherein the PCE composition further comprises a photoinitiator compound.

42. The film of claim 41 wherein the photoinitiator compound is present in from about 0.1 to 3 weight percent of the layer having PCE composition.

43. The film of claim 39 wherein the PCE composition further comprises a diluent polymer.

44. The film of claim 43 wherein the PCE composition further comprises a photoinitiator compound.

45. The film of claim 44 wherein the photoinitiator compound is present in from about 0.1 to 3 weight percent of the layer having the PCE composition.

46. The film of claim 43 wherein the at least one of said layers containing the PCE composition is an internal layer of the film.

47. The film of claim 43 wherein at least one layer forming a major surface of the film is sealable.

48. The film of claim 39 wherein the polyene monomer is selected from the group consisting of 5-ethylidene-2-norbornene, 5-methylidene-2-norbornene, 5-vinyl-2-norbornene, 5-methylene-2-norbornene, 2,5-norbornadiene, butadiene, isoprene, 1,4-hexadiene, 4-methyl-1,4-hexadiene, 5-methyl-1,4-hexadiene, 4-ethyl-1,4-hexadiene, 1,5-hexadiene, 1,6-heptadiene, 1,4-heptadiene, 1,5-heptadiene, 5-methyl-1,4-heptadiene, 1,4-octadiene, 1,5-octadiene, 1,6-octadiene, 5-ethyl-1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 1,9-decadiene, 6-methyl-1,6-undecadiene, 1,8-nonadiene, 1,13-tetradecadiene, 1,4-dodecadiene, cyclooctadiene, 4-vinylcyclohexene, 1,4-divinylcyclohexane, 1,3-divinylcyclohexene, 1-allyl-4-vinylcyclohexane, 1,4-divinylcyclohexane, 1,3-divinylcyclopentane, 1-allyl-3-vinylcyclopentane, 1,5-divinylcyclooctane, 1-allyl-5-vinylcyclooctane, 1,5-diallylcyclooctane, 1-allyl-4-isopropenylcyclooctane, 1-allyl-4-isopropenylcyclohexane, 1-isopropenyl-3-vinylcyclopentane, 1-allyl-4-isopropenylcyclohexane, 4-vinylcyclohexene, dicyclopentadiene, divinylbenzene, and vinylisopropenylbenzene.

49. A process of forming a film having a plurality of layers and at least one of said layers is selected to have an elevated degree of crosslink with respect to at least one other layer comprising A. extruding a film having a plurality of layers wherein at least one of said layers contains a PCE composition comprising
  (i) copolymer having polymeric units derived from (a) at least one polyene monomer, (b) at least one $C_2$–$C_{20}$ olefinic monomer and, optionally, (c) at least one copolymerizable monomer other than (a) or (b); or
  (ii) mixture composed of at least one polymer having polymeric units derived from (a) at least one polyene monomer, and at least one polymer comprising polymeric units derived from (b) at least one $C_2$–$C_{20}$ olefinic monomer and, optionally, at least one copolymerizable monomer other than (a) or (b); and B. subjecting the film to actinic radiation.

50. The process of claim 49 wherein the radiation is selected from ionizing radiation or ultra-violet radiation.

51. The process of claim 49 wherein the film formed is according to claim 2, 3, 4, 5, 6, 7, 8, 9, 10, 11, 12, 13, 14, 15, 16, 17, 18 or 19.

52. The process of claim 51 wherein the film is at a temperature higher than ambient temperature during irradiation.

53. The process of claim 51 wherein the layer having the PCE composition is in a molten state.

54. The process of claim 51 wherein the film is subjected to ultra-violet radiation and the PCE composition further comprises a photoinitiator compound.

55. The process of claim 51 wherein the film is subjected to electron beam radiation or ionizing irradiation.

56. A package comprising a film surrounding a cavity suitable for containing or containing an article, the film being a multilayer film having at least one layer of said film containing a PCE composition comprising
  (i) copolymer having polymeric units derived from (a) at least one polyene monomer, (b) at least one $C_2$–$C_{20}$ olefinic monomer and, optionally, (c) at least one copolymerizable monomer other than (a) or (b); or
  (ii) polymer mixture composed of at least one polymer having polymeric units derived from (a) at least one polyene monomer, and at least one polymer having polymeric units derived from (b) at least one $C_2$–$C_{20}$ olefinic monomer and, optionally, at least one copolymerizable monomer other than (a) or (b);
each of said at least one layer formed with PCE composition being crosslinked to a greater degree than at least one other layer of said film.

57. The package of claim 56 wherein the PCE composition is PCE composition (i).

58. The package of claim 56 wherein the PCE composition is PCE composition (ii).

59. The package of claim 56 wherein the PCE composition further comprises a diluent polymer.

60. The package of claim 56 wherein the polyene of the PCE composition is present in sufficient amount to provide 10 to 25,000 carbon to carbon double bonds per 100,000 carbon atoms contained in the layer having said PCE composition.

61. The package of claim 57 wherein the PCE copolymer (i) has a weight average molecular weight (Mw) of at least about 10,000 daltons.

62. The package of claim 58 wherein the PCE copolymer (ii) has a weight average molecular weight (Mw) of at least 1,000 daltons.

63. The package of claim 56 wherein the PCE composition comprises copolymer (i) and said copolymer is an AUPO copolymer.

64. The package of claim 58 wherein the copolymer is an ethylene/propylene/polyene copolymer.

65. The package of claim 59 wherein the copolymer is an ethylene/propylene/polyene copolymer.

66. The package of claim 63 wherein the copolymer is an ethylene/propylene/polyene copolymer.

67. The package of claim 57 wherein the PCE composition further comprises a photoinitiator compound.

68. The package of claim 58 wherein the PCE composition further comprises a photoinitiator compound.

69. The package of claim 59 wherein the PCE composition further comprises a photoinitiator compound.

70. The package of claim 67 wherein the photoinitiator compound is present in from about 0.1 to 3 weight percent of the layer having the PCE composition.

71. The package of claim 68 wherein the photoinitiator compound is present in from about 0.1 to 3 weight percent of the layer having the PCE composition.

72. The package of claim 69 wherein the photoinitiator compound is present in from about 0.1 to 3 weight percent of the layer having the PCE composition.

73. The package of claim 56 wherein the at least one of said layers containing the PCE composition is an internal layer of the film.

74. The package of claim 63 wherein the at least one of said layers containing the PCE composition is an internal layer of the film.

75. The package of claim 65 wherein the at least one of said layers containing the PCE composition is an internal layer of the film.

76. The package of claim 56 wherein at least one layer forming a major surface of the film is sealable.

77. The package of claim 63 wherein at least one layer forming a major surface of the film is sealable.

78. The package of claim 65 wherein at least one layer forming a major surface of the film is sealable.

79. The package of claim 56 wherein the polyene monomer comprises a non-conjugated polyene.

80. The package of claim 56 wherein the polyene monomer comprises a substituted polyene.

81. The package of claim 56 wherein the polyene monomer comprises a polyene with vinyl unsaturation.

82. The package of claim 56 wherein the polyene monomer comprises a diene.

83. The package of claim 63 wherein the PCE copolymer comprises a single-site catalyzed unsaturated polymeric material and the polyene monomer comprises a polyene with vinyl unsaturation.

84. The package of claim 56 wherein the PCE copolymer comprises semi-crystalline material.

85. The package of claim 56 wherein the polyene monomer is selected from the group consisting of 5-ethylidene-2-norbornene, 5-methylidene-2-norbornene, 5-vinyl-2-norbornene, 5-methylene-2-norbornene, 2,5-norbornadiene, butadiene, isoprene, 1,4-hexadiene, 4-methyl-1,4-hexadiene, 5-methyl-1,4-hexadiene, 4-ethyl-1,4-hexadiene, 1,5-hexadiene, 1,6-heptadiene, 1,4-heptadiene, 1,5-heptadiene, 5-methyl-1,4-heptadiene, 1,4-octadiene, 1,5-octadiene, 1,6-octadiene, 5-ethyl-1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 1,9-decadiene, 6-methyl-1,6-undecadiene, 1,8-nonadiene, 1,13-tetradecadiene, 1,4-dodecadiene, cyclooctadiene, 4-vinylcyclohexene, 1,4-divinylcyclohexane, 1,3-divinylcyclohexene, 1-allyl-4-vinylcyclohexane, 1,4-divinylcyclohexane, 1,3-divinylcyclopentane, 1-allyl-3-vinylcyclopentane, 1,5-divinylcyclooctane, 1-allyl-5-vinylcyclooctane, 1,5-diallylcyclooctane, 1-allyl-4-isopropenylcyclooctane, 1-allyl-4-isopropenylcyclohexane, 1-isopropenyl-3-vinylcyclopentane, 1-allyl-4-isopropenylcyclohexane, 4-vinylcyclohexene, dicyclopentadiene, divinylbenzene, and vinylisopropenylbenzene.

86. The package of claim 56 wherein the $C_2$ to $C_{20}$ olefinic monomer is selected from the group consisting of ethylene, propylene, 1-butene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 3,5,5-trimethylhexene, 1-octene, 1-decene, 1-dodecene, 1-tetradecene, 1-hexadecene, 1-octadecene, and 1-eicosene.

87. The package of claim 56 wherein the additional monomer (c) is selected from the group consisting of vinyl aromatics, cycloolefin monomers, unsaturated esters, unsaturated acids, and salts of unsaturated acids.

88. The package of claim 61 wherein the PCE copolymer (i) has a weight average molecular weight ($M_w$) of at least 20,000 daltons.

89. The package of claim 56 wherein the copolymer of PCE copolymer has a density at 25° C. of between 0.8 and 1.0 g/cc.

90. The package of claim 58 wherein the second polymer of the PCE composition (ii) is selected from the group consisting of polyethylene, ethylene/olefin copolymer, propylene/olefin copolymer, polypropylene, polyvinyl chloride, polyvinylidene dichloride, polybutene, ethylene/acid copolymer, and ethylene/ester copolymer.

91. A polymeric composition capable of causing enhanced degree of crosslink, comprising a copolymer having polymeric units derived from (a) at least one polyene, (b) at least one $C_2$–$C_5$ olefinic monomer and, optionally, (c) at least copolymerizable monomer other than (a) or (b);

a diluent polymer selected from the group consisting of polypropylene, polyvinyl chloride, polybutene, and copolymers and mixtures thereof; and a photoinitiator.

92. The polymeric composition of claim 91 wherein the copolymer contains at least 10 to 25,000 carbon to carbon double bonds per 100,000 carbon atoms of the copolymer molecule.

93. The polymer composition of claim 91 wherein the copolymer has a weight average molecular weight of at least about 10,000 daltons.

94. The polymeric composition of claim 91 wherein said diluent polymer is a polymer or copolymer having tertiary carbon atoms in the polymer molecule.

* * * * *